United States Patent
Yashima et al.

(10) Patent No.: US 7,898,960 B2
(45) Date of Patent: Mar. 1, 2011

(54) SYSTEM, METHOD, AND COMPUTER PRODUCT FOR CONTROLLING BANDWIDTH

(75) Inventors: Hiroaki Yashima, Fukuoka (JP); Shinichi Shiwachi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 192 days.

(21) Appl. No.: 11/845,216

(22) Filed: Aug. 27, 2007

(65) Prior Publication Data
US 2008/0095184 A1    Apr. 24, 2008

(30) Foreign Application Priority Data
Oct. 20, 2006  (JP) ................. 2006-286854

(51) Int. Cl.
*H04L 12/26*    (2006.01)
(52) U.S. Cl. ............. 370/235.1; 370/437; 370/450; 370/468; 709/226
(58) Field of Classification Search .......... 370/229, 370/230, 230.1, 232, 235, 235.1, 351, 389, 370/395.1, 395.41, 431, 449, 450, 464, 465, 370/468, 477; 379/219, 220.01, 221.06, 379/221.07; 455/403, 422.1, 450, 452.1, 455/452.2; 709/223, 226, 227, 229
See application file for complete search history.

(56) References Cited

U.S. PATENT DOCUMENTS

| | | | | |
|---|---|---|---|---|
| 5,596,576 | A | * 1/1997 | Milito | 370/450 |
| 2004/0037306 | A1 | * 2/2004 | Khan et al. | 370/437 |
| 2005/0120102 | A1 | * 6/2005 | Gandhi et al. | 709/223 |
| 2007/0223375 | A1 | * 9/2007 | Ohta et al. | 370/230 |

FOREIGN PATENT DOCUMENTS

| | | |
|---|---|---|
| JP | 10-247944 | 9/1998 |
| JP | 11-122279 | 4/1999 |
| JP | 2000-324119 | 11/2000 |
| JP | 2004-336549 A | 11/2004 |

OTHER PUBLICATIONS

Japan Patent Office; Office Action mailed in connection with JP patent application No. 2006-286854 on Nov. 16, 2010; which application corresponds to the above captioned US application.

* cited by examiner

*Primary Examiner* — Seema S Rao
*Assistant Examiner* — Khoa Huynh
(74) *Attorney, Agent, or Firm* — Fujitsu Patent Center

(57) ABSTRACT

A surplus amount of token calculating unit calculates a surplus amount of token for a station in which a residual amount of output buffer is smaller than a residual amount of token. A necessary amount of token calculating unit calculates a necessary amount of token for a station in which the residual amount of output buffer is larger than the residual amount of token. A token distributing unit distributes a token within a range of the surplus amount of token to a token counter of a station in which the necessary amount of token has been calculated, from a station in which the surplus amount of token has been calculated.

3 Claims, 32 Drawing Sheets

FIG.5
TOKEN COUNTER FOR STATION A
| MAXIMUM AMOUNT OF TOKEN | 100 |
|---|---|
| RESIDUAL AMOUNT OF TOKEN | 40 |
| RESIDUAL AMOUNT OF OUTPUT BUFFER | 10 |
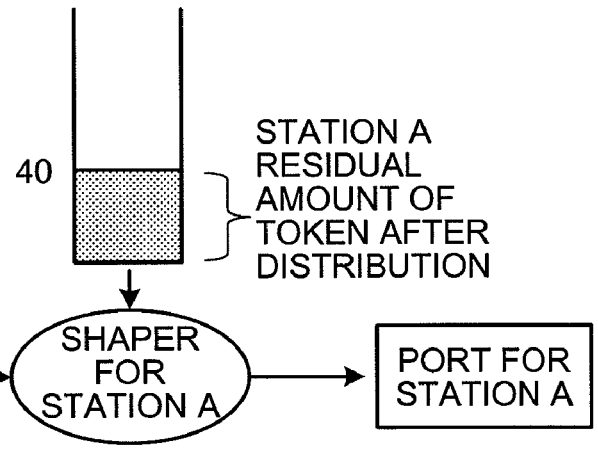
STATION A RESIDUAL AMOUNT OF TOKEN AFTER DISTRIBUTION
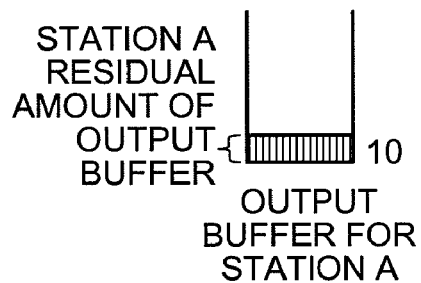
STATION A RESIDUAL AMOUNT OF OUTPUT BUFFER
OUTPUT BUFFER FOR STATION A

FIG.7

STATION A

| MAXIMUM AMOUNT OF TOKEN | 100 |
|---|---|
| RESIDUAL AMOUNT OF TOKEN | 70 |
| RESIDUAL AMOUNT OF OUTPUT BUFFER | 10 |

- COMPARE RESIDUAL AMOUNT OF TOKEN WITH RESIDUAL AMOUNT OF OUTPUT BUFFER: RESIDUAL AMOUNT OF TOKEN > RESIDUAL AMOUNT OF OUTPUT BUFFER
- CALCULATE SURPLUS AMOUNT OF TOKEN: (RESIDUAL AMOUNT OF TOKEN "70")-(RESIDUAL AMOUNT OF OUTPUT BUFFER "10") = (SURPLUS AMOUNT OF TOKEN "60")

STATION B

| MAXIMUM AMOUNT OF TOKEN | 10 |
|---|---|
| RESIDUAL AMOUNT OF TOKEN | 5 |
| RESIDUAL AMOUNT OF OUTPUT BUFFER | 30 |

- COMPARE RESIDUAL AMOUNT OF TOKEN WITH RESIDUAL AMOUNT OF OUTPUT BUFFER: RESIDUAL AMOUNT OF TOKEN < RESIDUAL AMOUNT OF OUTPUT BUFFER
- CALCULATE NECESSARY AMOUNT OF TOKEN: (RESIDUAL AMOUNT OF OUTPUT BUFFER "30")- (RESIDUAL AMOUNT OF TOKEN "5") = (NECESSARY AMOUNT OF TOKEN "25")

FIG.8

STATION A

| MAXIMUM AMOUNT OF TOKEN | 100 |
|---|---|
| RESIDUAL AMOUNT OF TOKEN | 70 |
| RESIDUAL AMOUNT OF OUTPUT BUFFER | 10 |

- COMPARE RESIDUAL AMOUNT OF TOKEN WITH RESIDUAL AMOUNT OF OUTPUT BUFFER: RESIDUAL AMOUNT OF TOKEN > RESIDUAL AMOUNT OF OUTPUT BUFFER
- CALCULATE SURPLUS AMOUNT OF TOKEN: (RESIDUAL AMOUNT OF TOKEN "70")-(RESIDUAL AMOUNT OF OUTPUT BUFFER "10") = (SURPLUS AMOUNT OF TOKEN "60")

STATION B

| MAXIMUM AMOUNT OF TOKEN | 10 |
|---|---|
| RESIDUAL AMOUNT OF TOKEN | 5 |
| RESIDUAL AMOUNT OF OUTPUT BUFFER | 70 |

- COMPARE RESIDUAL AMOUNT OF TOKEN WITH RESIDUAL AMOUNT OF OUTPUT BUFFER: RESIDUAL AMOUNT OF TOKEN < RESIDUAL AMOUNT OF OUTPUT BUFFER
- CALCULATE NECESSARY AMOUNT OF TOKEN: (RESIDUAL AMOUNT OF OUTPUT BUFFER "70")- (RESIDUAL AMOUNT OF TOKEN "5") = (NECESSARY AMOUNT OF TOKEN "65")

FIG.9

| STATION A | |
|---|---|
| MAXIMUM AMOUNT OF TOKEN | 100 |
| RESIDUAL AMOUNT OF TOKEN | 70 |
| RESIDUAL AMOUNT OF OUTPUT BUFFER | 10 |

| STATION B | |
|---|---|
| MAXIMUM AMOUNT OF TOKEN | 10 |
| RESIDUAL AMOUNT OF TOKEN | 5 |
| RESIDUAL AMOUNT OF OUTPUT BUFFER | 30 |

STATION A SURPLUS AMOUNT OF TOKEN = "60"

STATION B NECESSARY AMOUNT OF TOKEN = "25"

↑

| STATION A | |
|---|---|
| MAXIMUM AMOUNT OF TOKEN | 100 |
| RESIDUAL AMOUNT OF TOKEN | 40 |
| RESIDUAL AMOUNT OF OUTPUT BUFFER | 10 |

| STATION B | |
|---|---|
| MAXIMUM AMOUNT OF TOKEN | 10 |
| RESIDUAL AMOUNT OF TOKEN | 35 |
| RESIDUAL AMOUNT OF OUTPUT BUFFER | 30 |

DISTRIBUTE AMOUNT OF TOKEN WITHIN RANGE OF SURPLUS AMOUNT OF TOKEN = "60" TO TOKEN COUNTER FOR STATION B

DISTRIBUTE "30" IN EMBODIMENT

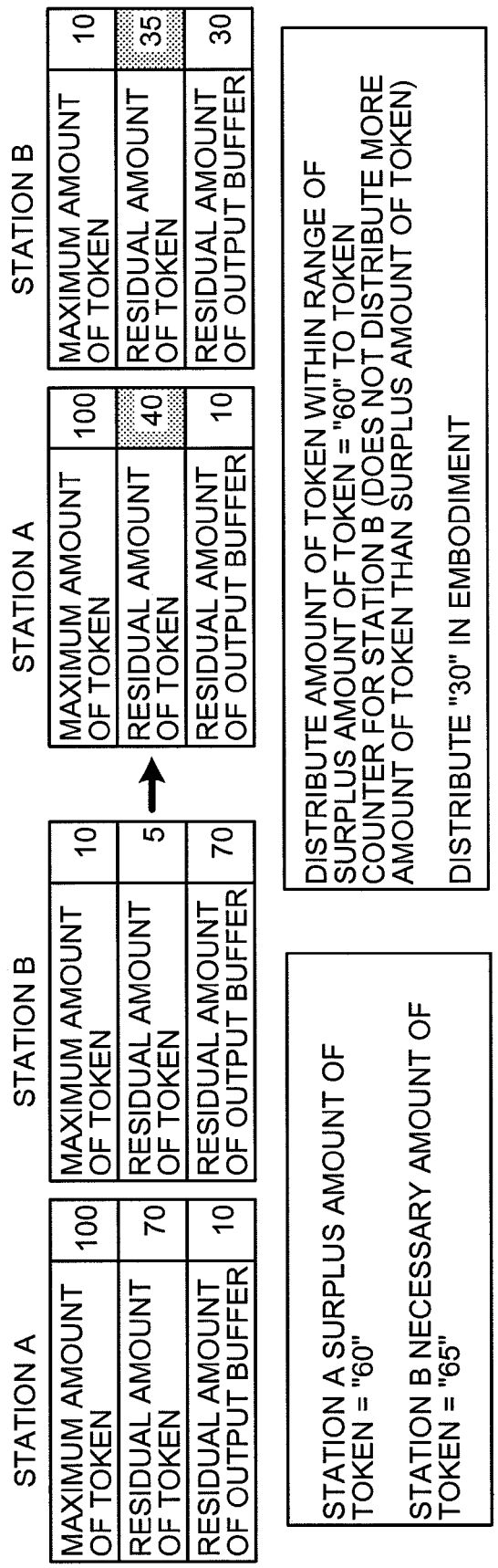

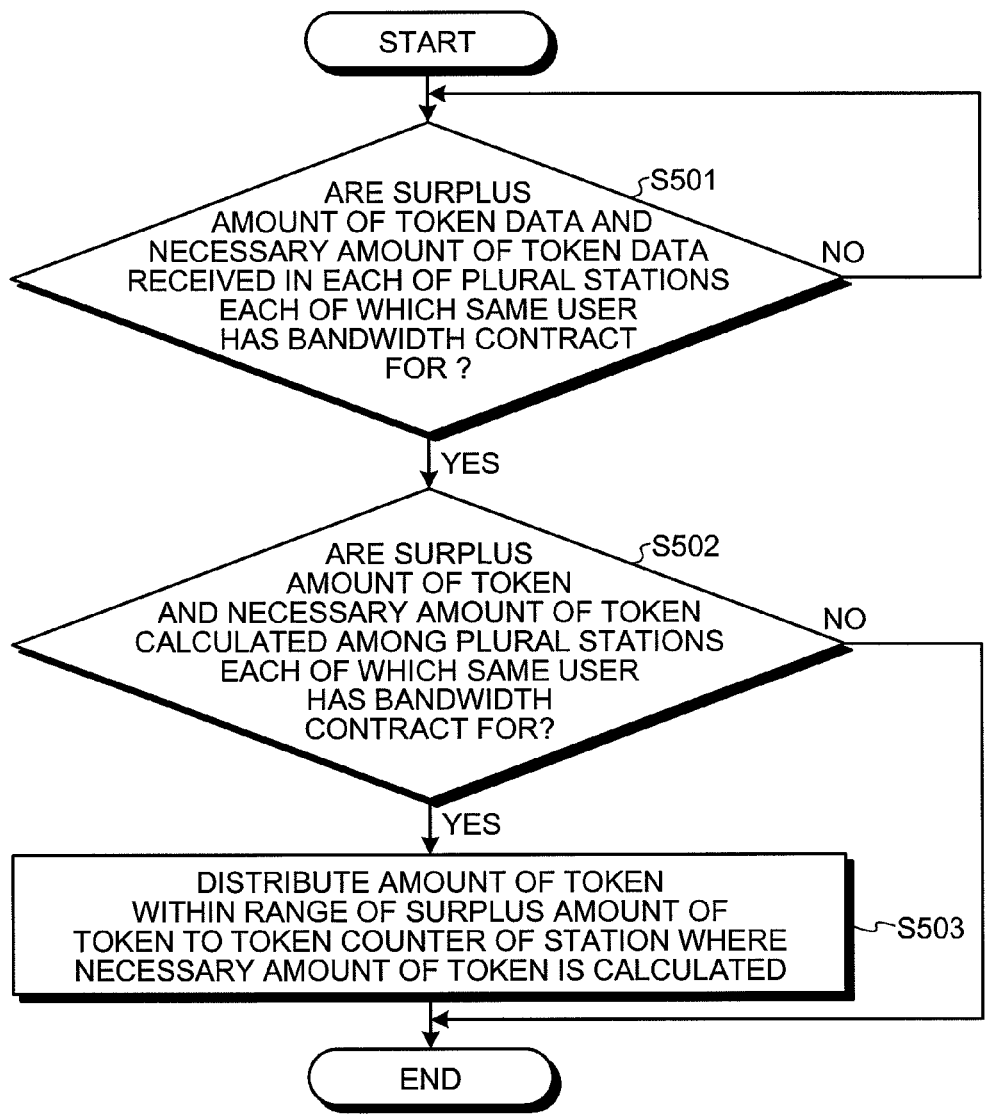

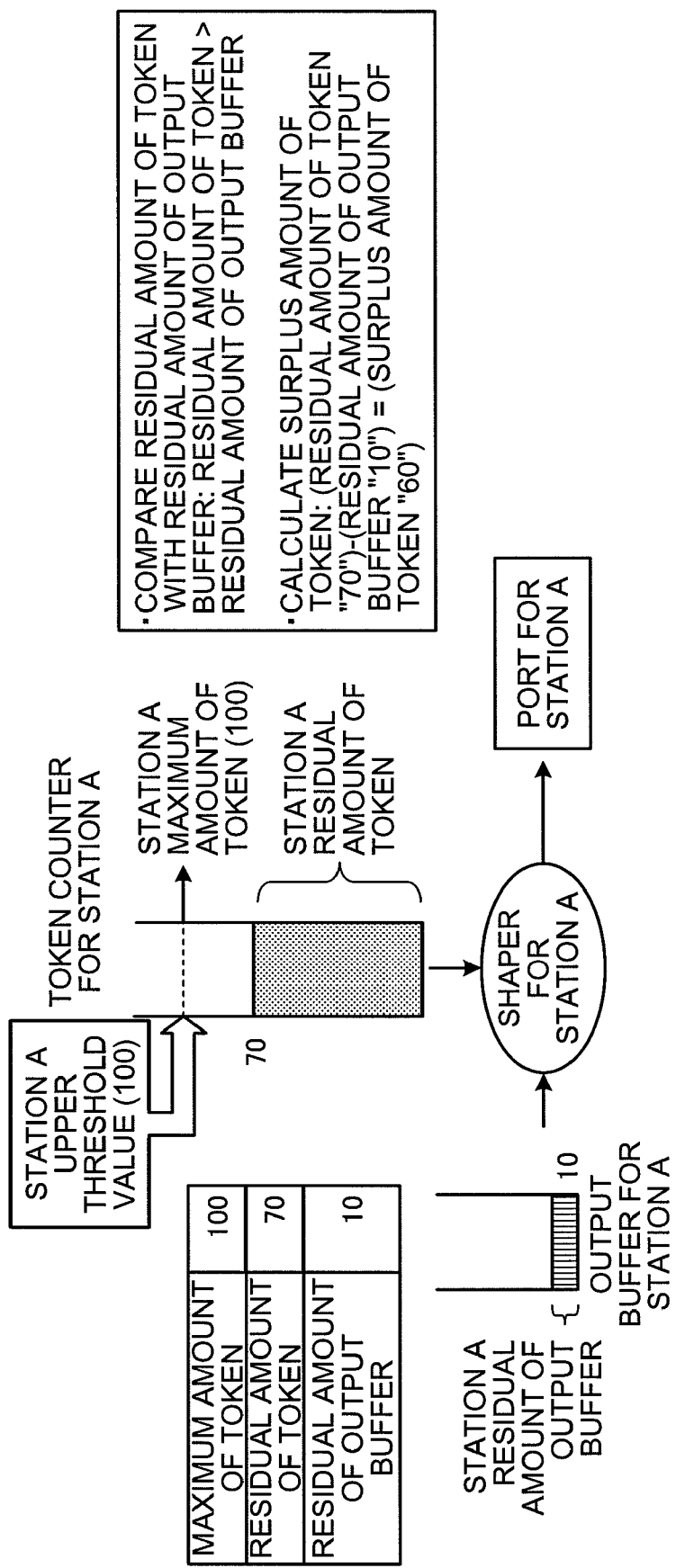

FIG.16

STATION A

| MAXIMUM AMOUNT OF TOKEN | 100 |
|---|---|
| RESIDUAL AMOUNT OF TOKEN | 70 |
| RESIDUAL AMOUNT OF OUTPUT BUFFER | 10 |

- COMPARE RESIDUAL AMOUNT OF TOKEN WITH RESIDUAL AMOUNT OF OUTPUT BUFFER: RESIDUAL AMOUNT OF TOKEN > RESIDUAL AMOUNT OF OUTPUT BUFFER
- CALCULATE SURPLUS AMOUNT OF TOKEN: (RESIDUAL AMOUNT OF TOKEN "70")-(RESIDUAL AMOUNT OF OUTPUT BUFFER "10") = (SURPLUS AMOUNT OF TOKEN "60")

FIG.17

STATION B

| MAXIMUM AMOUNT OF TOKEN | 10 |
|---|---|
| RESIDUAL AMOUNT OF TOKEN | 5 |
| RESIDUAL AMOUNT OF OUTPUT BUFFER | 30 |

- COMPARE RESIDUAL AMOUNT OF TOKEN WITH RESIDUAL AMOUNT OF OUTPUT BUFFER: RESIDUAL AMOUNT OF TOKEN < RESIDUAL AMOUNT OF OUTPUT BUFFER
- CALCULATE NECESSARY AMOUNT OF TOKEN: (RESIDUAL AMOUNT OF OUTPUT BUFFER "30")-(RESIDUAL AMOUNT OF TOKEN "5") = (NECESSARY AMOUNT OF TOKEN "25")

FIG.24

STATION A

| MAXIMUM AMOUNT OF TOKEN | 100 |
|---|---|
| RESIDUAL AMOUNT OF TOKEN | 70 |
| RESIDUAL AMOUNT OF OUTPUT BUFFER | 75 |

- COMPARE RESIDUAL AMOUNT OF TOKEN WITH RESIDUAL AMOUNT OF OUTPUT BUFFER: RESIDUAL AMOUNT OF TOKEN < RESIDUAL AMOUNT OF OUTPUT BUFFER
- CALCULATE NECESSARY AMOUNT OF TOKEN: (RESIDUAL AMOUNT OF OUTPUT BUFFER "75")-(RESIDUAL AMOUNT OF TOKEN "70") = (NECESSARY AMOUNT OF TOKEN "5")

FIG.25

STATION B

| MAXIMUM AMOUNT OF TOKEN | 10 |
|---|---|
| RESIDUAL AMOUNT OF TOKEN | 10 |
| RESIDUAL AMOUNT OF OUTPUT BUFFER | 15 |

- COMPARE RESIDUAL AMOUNT OF TOKEN WITH RESIDUAL AMOUNT OF OUTPUT BUFFER: RESIDUAL AMOUNT OF TOKEN < RESIDUAL AMOUNT OF OUTPUT BUFFER
- CALCULATE NECESSARY AMOUNT OF TOKEN: (RESIDUAL AMOUNT OF OUTPUT BUFFER "15")-(RESIDUAL AMOUNT OF TOKEN "10") = (NECESSARY AMOUNT OF TOKEN "5")

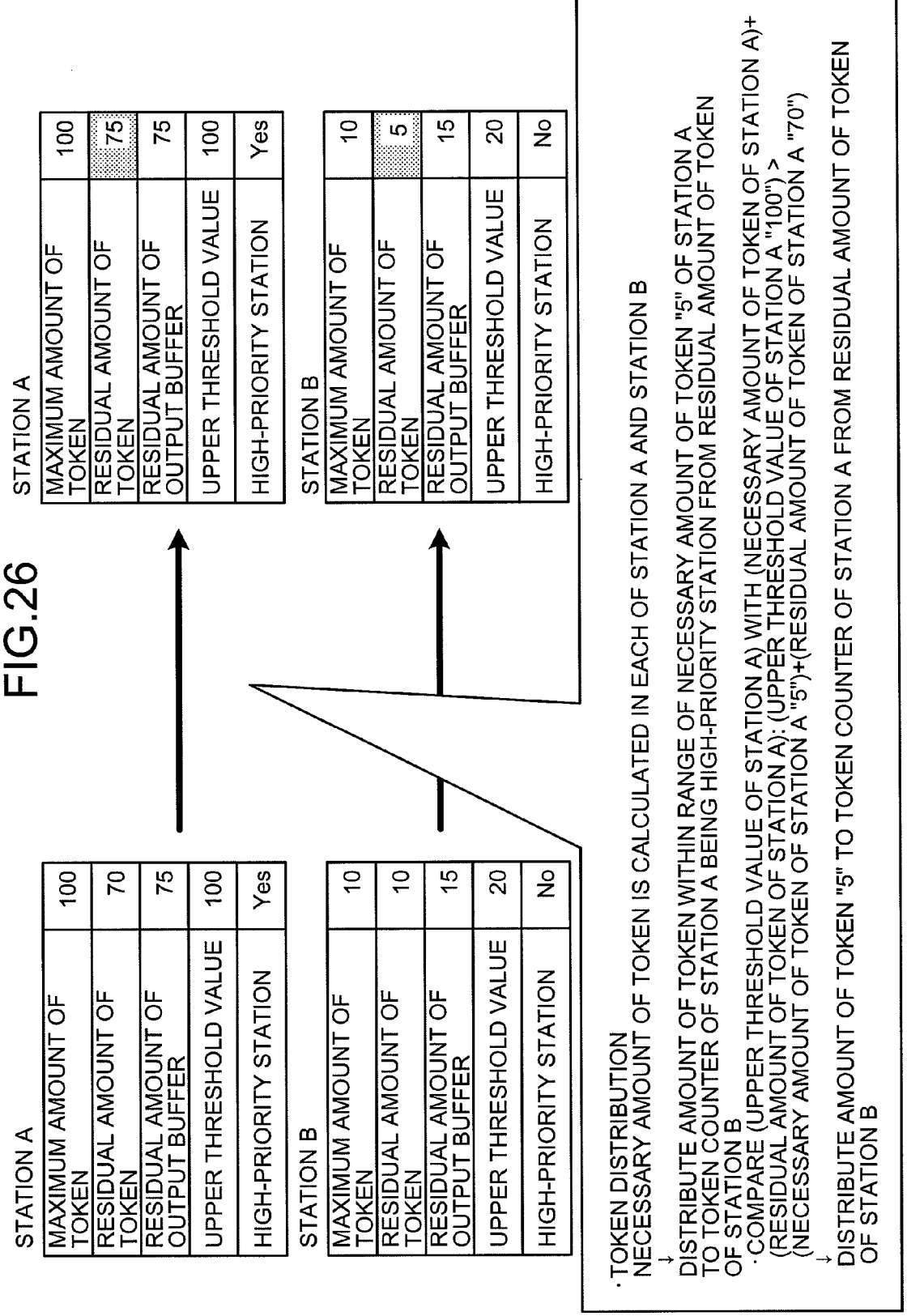

FIG.30

STATION A

| MAXIMUM AMOUNT OF TOKEN | 100 |
|---|---|
| RESIDUAL AMOUNT OF TOKEN | 70 |
| RESIDUAL AMOUNT OF OUTPUT BUFFER | 85 |
| UPPER THRESHOLD VALUE | 100 |
| HIGH-PRIORITY STATION | Yes |
| LOWER THRESHOLD VALUE | 60 |

STATION B

| MAXIMUM AMOUNT OF TOKEN | 30 |
|---|---|
| RESIDUAL AMOUNT OF TOKEN | 20 |
| RESIDUAL AMOUNT OF OUTPUT BUFFER | 25 |
| UPPER THRESHOLD VALUE | 40 |
| HIGH-PRIORITY STATION | No |
| LOWER THRESHOLD VALUE | 15 |

→

STATION A

| MAXIMUM AMOUNT OF TOKEN | 100 |
|---|---|
| RESIDUAL AMOUNT OF TOKEN | 75 |
| RESIDUAL AMOUNT OF OUTPUT BUFFER | 85 |
| UPPER THRESHOLD VALUE | 100 |
| HIGH-PRIORITY STATION | Yes |
| LOWER THRESHOLD VALUE | 60 |

STATION B

| MAXIMUM AMOUNT OF TOKEN | 30 |
|---|---|
| RESIDUAL AMOUNT OF TOKEN | 15 |
| RESIDUAL AMOUNT OF OUTPUT BUFFER | 25 |
| UPPER THRESHOLD VALUE | 40 |
| HIGH-PRIORITY STATION | No |
| LOWER THRESHOLD VALUE | 15 |

- TOKEN DISTRIBUTION
  NECESSARY AMOUNT OF TOKEN IS CALCULATED IN EACH OF STATION A AND STATION B

DISTRIBUTE AMOUNT OF TOKEN WITHIN RANGE OF NECESSARY AMOUNT OF TOKEN "15" OF STATION A TO TOKEN COUNTER OF STATION A BEING HIGH-PRIORITY STATION FROM RESIDUAL AMOUNT OF TOKEN OF STATION B

- COMPARE (NECESSARY AMOUNT OF TOKEN OF STATION A)+(LOWER THRESHOLD VALUE OF STATION B) WITH (RESIDUAL AMOUNT OF TOKEN OF STATION B): (NECESSARY AMOUNT OF TOKEN OF STATION A "15")+(LOWER THRESHOLD VALUE OF STATION B "15") > (RESIDUAL AMOUNT OF TOKEN OF STATION B "20")
  →
- CALCULATE AMOUNT OF TOKEN TO BE DISTRIBUTED
  (RESIDUAL AMOUNT OF TOKEN OF STATION B "20")−(LOWER THRESHOLD VALUE OF STATION B "15") = (DISTRIBUTED AMOUNT OF TOKEN "5")

FIG.32

STATION A

| MAXIMUM AMOUNT OF TOKEN | 100 |
|---|---|
| RESIDUAL AMOUNT OF TOKEN | 70 |
| RESIDUAL AMOUNT OF OUTPUT BUFFER | 85 |

- COMPARE RESIDUAL AMOUNT OF TOKEN WITH RESIDUAL AMOUNT OF OUTPUT BUFFER: RESIDUAL AMOUNT OF TOKEN < RESIDUAL AMOUNT OF OUTPUT BUFFER
- CALCULATE NECESSARY AMOUNT OF TOKEN: (RESIDUAL AMOUNT OF OUTPUT BUFFER "85")-(RESIDUAL AMOUNT OF TOKEN "70") = (NECESSARY AMOUNT OF TOKEN "15")

FIG.33

STATION B

| MAXIMUM AMOUNT OF TOKEN | 30 |
|---|---|
| RESIDUAL AMOUNT OF TOKEN | 20 |
| RESIDUAL AMOUNT OF OUTPUT BUFFER | 25 |

- COMPARE RESIDUAL AMOUNT OF TOKEN WITH RESIDUAL AMOUNT OF OUTPUT BUFFER: RESIDUAL AMOUNT OF TOKEN < RESIDUAL AMOUNT OF OUTPUT BUFFER
- CALCULATE NECESSARY AMOUNT OF TOKEN: (RESIDUAL AMOUNT OF OUTPUT BUFFER "25")-(RESIDUAL AMOUNT OF TOKEN "20") = (NECESSARY AMOUNT OF TOKEN "5")

FIG. 34

STATION A (before)

| | |
|---|---|
| MAXIMUM AMOUNT OF TOKEN | 100 |
| RESIDUAL AMOUNT OF TOKEN | 70 |
| RESIDUAL AMOUNT OF OUTPUT BUFFER | 85 |
| UPPER THRESHOLD VALUE | 100 |
| HIGH-PRIORITY STATION | Yes |
| LOWER THRESHOLD VALUE | 60 |

STATION B (before)

| | |
|---|---|
| MAXIMUM AMOUNT OF TOKEN | 30 |
| RESIDUAL AMOUNT OF TOKEN | 20 |
| RESIDUAL AMOUNT OF OUTPUT BUFFER | 25 |
| UPPER THRESHOLD VALUE | 40 |
| HIGH-PRIORITY STATION | No |
| LOWER THRESHOLD VALUE | 15 |

STATION A (after)

| | |
|---|---|
| MAXIMUM AMOUNT OF TOKEN | 100 |
| RESIDUAL AMOUNT OF TOKEN | 75 |
| RESIDUAL AMOUNT OF OUTPUT BUFFER | 85 |
| UPPER THRESHOLD VALUE | 100 |
| HIGH-PRIORITY STATION | Yes |
| LOWER THRESHOLD VALUE | 60 |

STATION B (after)

| | |
|---|---|
| MAXIMUM AMOUNT OF TOKEN | 30 |
| RESIDUAL AMOUNT OF TOKEN | 15 |
| RESIDUAL AMOUNT OF OUTPUT BUFFER | 25 |
| UPPER THRESHOLD VALUE | 40 |
| HIGH-PRIORITY STATION | No |
| LOWER THRESHOLD VALUE | 15 |

· TOKEN DISTRIBUTION
NECESSARY AMOUNT OF TOKEN IS CALCULATED IN EACH OF STATION A AND STATION B
→ DISTRIBUTE AMOUNT OF TOKEN WITHIN RANGE OF NECESSARY AMOUNT OF TOKEN "15" OF STATION A TO TOKEN COUNTER OF STATION A BEING HIGH-PRIORITY STATION FROM RESIDUAL AMOUNT OF TOKEN OF STATION B

· COMPARE (NECESSARY AMOUNT OF TOKEN OF STATION A)+(LOWER THRESHOLD VALUE OF STATION B) WITH (RESIDUAL AMOUNT OF TOKEN OF STATION B): (NECESSARY AMOUNT OF TOKEN OF STATION A "15")+(LOWER THRESHOLD VALUE OF STATION B "15") > (RESIDUAL AMOUNT OF TOKEN OF STATION B "20")
→ · CALCULATE AMOUNT OF TOKEN TO BE DISTRIBUTED:
(RESIDUAL AMOUNT OF TOKEN OF STATION B "20")−(LOWER THRESHOLD VALUE OF STATION B "15") = (DISTRIBUTED AMOUNT OF TOKEN "5")

· CONFIRM WHETHER AMOUNT OF TOKEN OF STATION A AFTER HAVING DISTRIBUTED AMOUNT OF TOKEN DISTRIBUTED IS EQUAL TO OR LESS THAN UPPER THRESHOLD VALUE OF STATION A:
(RESIDUAL AMOUNT OF TOKEN OF STATION A "70")+(DISTRIBUTED AMOUNT OF TOKEN "5") = (AMOUNT OF TOKEN OF STATION A AFTER DISTRIBUTION "75") < (UPPER THRESHOLD VALUE OF STATION A "100")
→ DISTRIBUTE AMOUNT OF TOKEN "5" TO TOKEN COUNTER OF STATION A BEING HIGH-PRIORITY STATION FROM RESIDUAL AMOUNT OF TOKEN OF STATION B

SYSTEM, METHOD, AND COMPUTER PRODUCT FOR CONTROLLING BANDWIDTH

BACKGROUND OF THE INVENTION

1. Field of the Invention

The present invention relates to a technology for distributing and controlling a token corresponding to a contraction bandwidth between a plurality of stations.

2. Description of the Related Art

A bandwidth control apparatus that controls a packet communication speed (bandwidth) to a plurality of receiver terminals is installed at a conventional relay station for a packet communication (see, for example, Japanese Patent Application Laid-Open No. H10-247944). In general, a bandwidth control is performed using a token (right of transmission) in the bandwidth control apparatus.

A bandwidth control apparatus installed in a repeater station performs a packet communication according to a contracted bandwidth by assigning an amount of token to be supplied per unit time according to a contracted content with a user (for example, a maximum downlink capacity of 100 Megabits per second (Mbps)), calculating a residual amount of token by subtracting an amount of token corresponding to a size of a transmission-permitted packet from the assigned amount of token each time a packet transmission to the user is permitted, and prohibiting the packet transmission (bandwidth control) at a point when the residual amount of token becomes "zero".

However, with the conventional technology described above, there has been a problem that a token assigned to each station according to a contracted bandwidth cannot be effectively used in a packet communication with a plurality of stations for which the same user has a bandwidth contract.

For example, in the case where a station B (for example, YY Branch of XX, Inc.) having a 10 Mbps contract is in a standby for a packet output or a packet discard is performed because a residual amount of token for the station B is "zero" while a good packet transmission is performed for a station A (for example, Headquarter of XX, Inc.) having a 100 Mbps contract because there is a sufficient residual amount of token, a user cannot effectively use the token for the station A with a sufficient residual amount as the token for the station B, in spite that the YY Branch of XX, Inc. and the Headquarter of XX, Inc. are the same user.

SUMMARY OF THE INVENTION

It is an object of the present invention to at least partially solve the problems in the conventional technology.

A system according to one aspect of the present invention is for distributing a token corresponding to a contraction bandwidth to a token counter of each of a plurality of stations and controlling a bandwidth according to a residual amount of token in the token counter by subtracting an amount of token corresponding to a packet from the token counter of a station each time the packet is read and relayed to each of the stations. The system includes a surplus amount of token calculating unit that calculates, for a station in which a residual amount of output buffer indicating a necessary amount of token for transmitting an untransmitted packet stored in the output buffer is smaller than the residual amount of token, a surplus amount of token by subtracting the residual amount of output buffer from the residual amount of token; a necessary amount of token calculating unit that calculates, for a station in which the residual amount of output buffer is larger than the residual amount of token, a necessary amount of token by subtracting the residual amount of token from the residual amount of output buffer; and a token distributing unit that distributes, upon calculating the surplus amount of token and the necessary amount of token between a plurality of stations for which a same user has a bandwidth contract, a token within a range of the surplus amount of token to a token counter of a station in which the necessary amount of token has been calculated, from a station in which the surplus amount of token has been calculated.

A method according to another aspect of the present invention is for distributing a token corresponding to a contraction bandwidth to a token counter of each of a plurality of stations and controlling a bandwidth according to a residual amount of token in the token counter by subtracting an amount of token corresponding to a packet from the token counter of a station each time the packet is read and relayed to each of the stations. The method includes calculating, for a station in which a residual amount of output buffer indicating a necessary amount of token for transmitting an untransmitted packet stored in the output buffer is smaller than the residual amount of token, a surplus amount of token by subtracting the residual amount of output buffer from the residual amount of token; calculating, for a station in which the residual amount of output buffer is larger than the residual amount of token, a necessary amount of token by subtracting the residual amount of token from the residual amount of output buffer; and distributing, upon calculating the surplus amount of token and the necessary amount of token between a plurality of stations for which a same user has a bandwidth contract, a token within a range of the surplus amount of token to a token counter of a station in which the necessary amount of token has been calculated, from a station in which the surplus amount of token has been calculated.

A computer-readable recording medium according to still another aspect of the present invention stores therein a computer program for distributing a token corresponding to a contraction bandwidth to a token counter of each of a plurality of stations and controlling a bandwidth according to a residual amount of token in the token counter by subtracting an amount of token corresponding to a packet from the token counter of a station each time the packet is read and relayed to each of the stations. The computer program causes a computer to execute calculating, for a station in which a residual amount of output buffer indicating a necessary amount of token for transmitting an untransmitted packet stored in the output buffer is smaller than the residual amount of token, a surplus amount of token by subtracting the residual amount of output buffer from the residual amount of token; calculating, for a station in which the residual amount of output buffer is larger than the residual amount of token, a necessary amount of token by subtracting the residual amount of token from the residual amount of output buffer; and distributing, upon calculating the surplus amount of token and the necessary amount of token between a plurality of stations for which a same user has a bandwidth contract, a token within a range of the surplus amount of token to a token counter of a station in which the necessary amount of token has been calculated, from a station in which the surplus amount of token has been calculated.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 2 to 5 are schematic diagrams for explaining an outline and features of a bandwidth control system according to the first embodiment;

FIGS. 7 and 8 are schematic diagrams for explaining a surplus amount of token calculating unit and a necessary amount of token calculating unit according to the first embodiment;

FIGS. 9 and 10 are schematic diagrams for explaining a token distribution control unit according to the first embodiment;

FIG. 11 is a flowchart of a token distribution control process according to the first embodiment;

FIGS. 12 to 14 are schematic diagrams for explaining an outline and features of a bandwidth control system according to a second embodiment of the present invention;

FIGS. 16 and 17 are schematic diagrams for explaining a surplus amount of token calculating unit and a necessary amount of token calculating unit according to the second embodiment;

FIGS. 24 and 25 are schematic diagrams for explaining a necessary amount of token calculating unit according to the third embodiment;

FIG. 26 is a schematic diagram for explaining a token distribution control unit according to the third embodiment;

FIGS. 28 to 30 are schematic diagrams for explaining an outline and features of a bandwidth control system according to a fourth embodiment of the present invention;

FIGS. 32 and 33 are schematic diagrams for explaining a necessary amount of token calculating unit according to the fourth embodiment;

FIG. 34 is a schematic diagram for explaining a token distribution control unit according to the fourth embodiment;

DETAILED DESCRIPTION OF THE PREFERRED EMBODIMENTS

Exemplary embodiments of the present invention are explained in detail below with reference to the accompanying drawings. A configuration and a processing procedure of a bandwidth control system according to a first embodiment of the present invention and an effect of the first embodiment are explained in order, followed by an explanation of a bandwidth control system according to a second embodiment of the present invention, a bandwidth control system according to a third embodiment of the present invention, a bandwidth control system according to a fourth embodiment of the present invention, and a bandwidth control system according to a fifth embodiment of the present invention.

FIGS. 1 to 5 are schematic diagrams for explaining an outline and features of a bandwidth control system according to the first embodiment.

When relaying a packet to a plurality of stations, the bandwidth control system according to the first embodiment generally distributes a token according to a contracted bandwidth to a token counter provided on each of the stations, subtracts an amount of token corresponding to a capacity of a packet each time the packet is read from an output buffer provided on each of the stations and is relayed to the stations, and thereby controls a bandwidth for each of the stations according to a residual amount of token remaining in the token counter of the station. The "token" is a "right of transmission" necessary for transmitting a predetermined capacity of packets to a predetermined station. The "amount of token" indicates a capacity of a packet permitted in transmission by the "token"; for example, the amount of token of 70 megabits (Mb) is expressed as "70".

Figure 1:
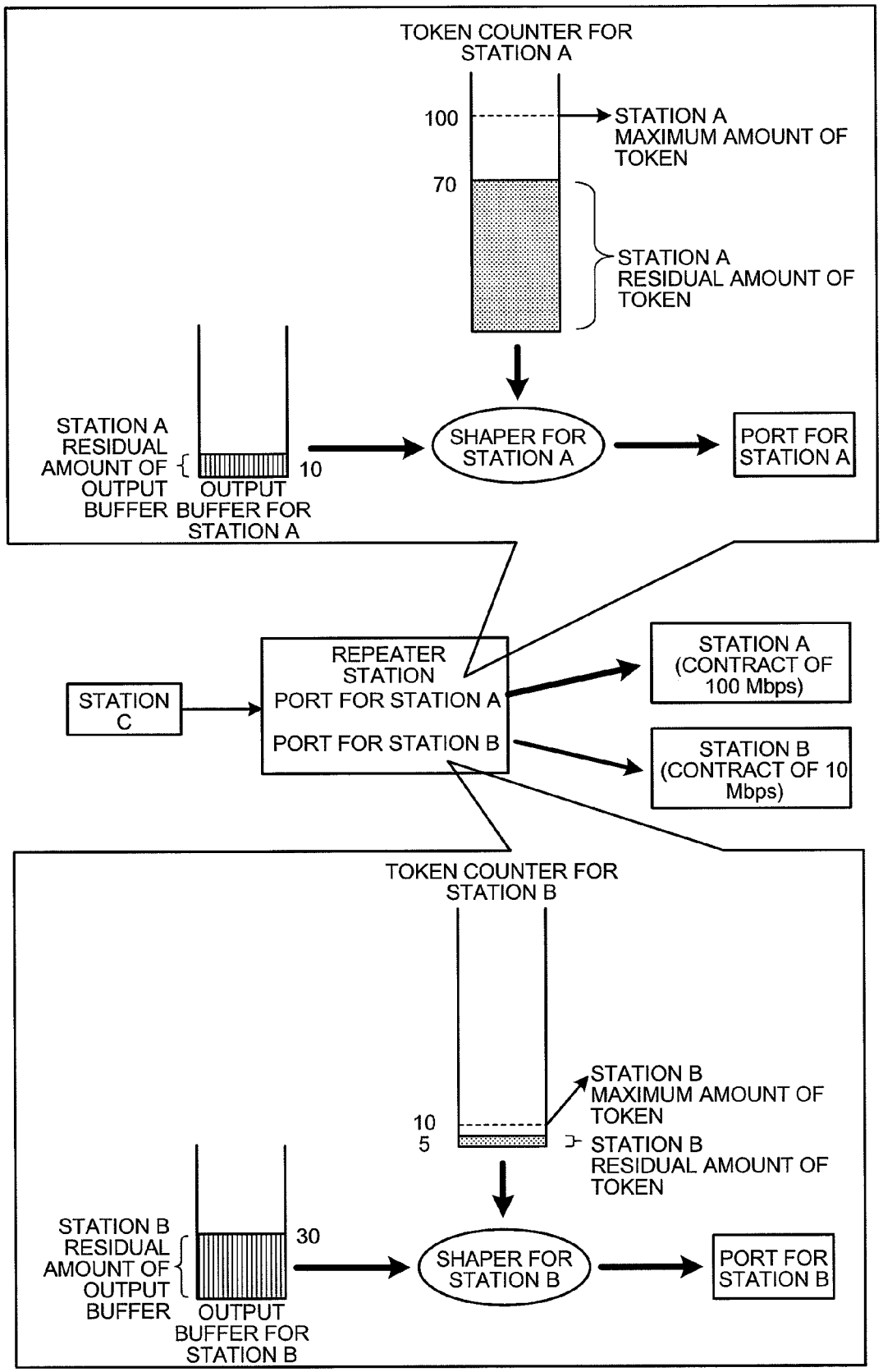
FIG. 1 is a schematic diagram for explaining an outline and features of a bandwidth control system according to a first embodiment of the present invention.

As shown in FIG. 1, for example, a repeater station of a packet communication transmits a packet from a user of a station C to a station A or a station B based on an address added to the packet. The repeater station transmits a packet provided with the address of the station A to the station A through a "port for station A" and transmits a packet provided with the address of the station B to the station B through a "port for station B". To control a bandwidth for the station A, a "token counter for station A", an "output buffer for station A", and a "shaper for station A", as well as the "port for station A", are installed in the repeater station, as shown in FIG. 1. To the "token counter for station A", "100" is assigned as the "maximum amount of token" being an amount of token to be distributed up to the maximum limit according to the contracted bandwidth (100 Mbps) of the station A, and each time a packet is read from the "output buffer for station A" in which untransmitted packets are stored and relayed to the station A, an amount of token corresponding to a capacity of the packet is subtracted from the "token counter for station A". The "shaper for station A" adjusts a transfer rate of the untransmitted packets to the station A stored in the "output buffer for station A" according to a "residual amount of token" remaining in the "token counter for station A".

For example, as shown in FIG. 1, when the "residual amount of token" remaining in the "token counter for station A" is "70" in the station A having the "maximum amount of token" of "100" and the "residual amount of output buffer" being a necessary amount of token for transmitting the untransmitted packets to the station A stored in the "output buffer for station A" at the same point is "10", the "shaper for station A" transmits packets successively to the "port for station A" since the "token counter for station A" has a sufficient amount of token for transmitting the untransmitted packets stored in the "output buffer for station A".

In a similar manner to the station A, to control a bandwidth for the station B, a "token counter for station B", an "output buffer for station B", and a "shaper for station B", as well as the "port for station B", are installed, and they respectively function in a similar manner to those of the station A. For example, as shown in FIG. 1, when the "residual amount of token" remaining in the "token counter for station B" is "5" and the "residual amount of output buffer" being a necessary amount of token for transmitting the untransmitted packets to the station B stored in the "output buffer for station B" at the same point is "30" in the station B having the "maximum amount of token" of "10" being an "amount of token" to be distributed up to the maximum limit according to a contracted bandwidth (10 Mbps), the "shaper for station B" keeps the untransmitted packets in a standby in the "output buffer for station B" since there is not a sufficient amount of token for transmitting the untransmitted packets stored in the "output buffer for station B" in the "token counter for station B".

Figure 2:
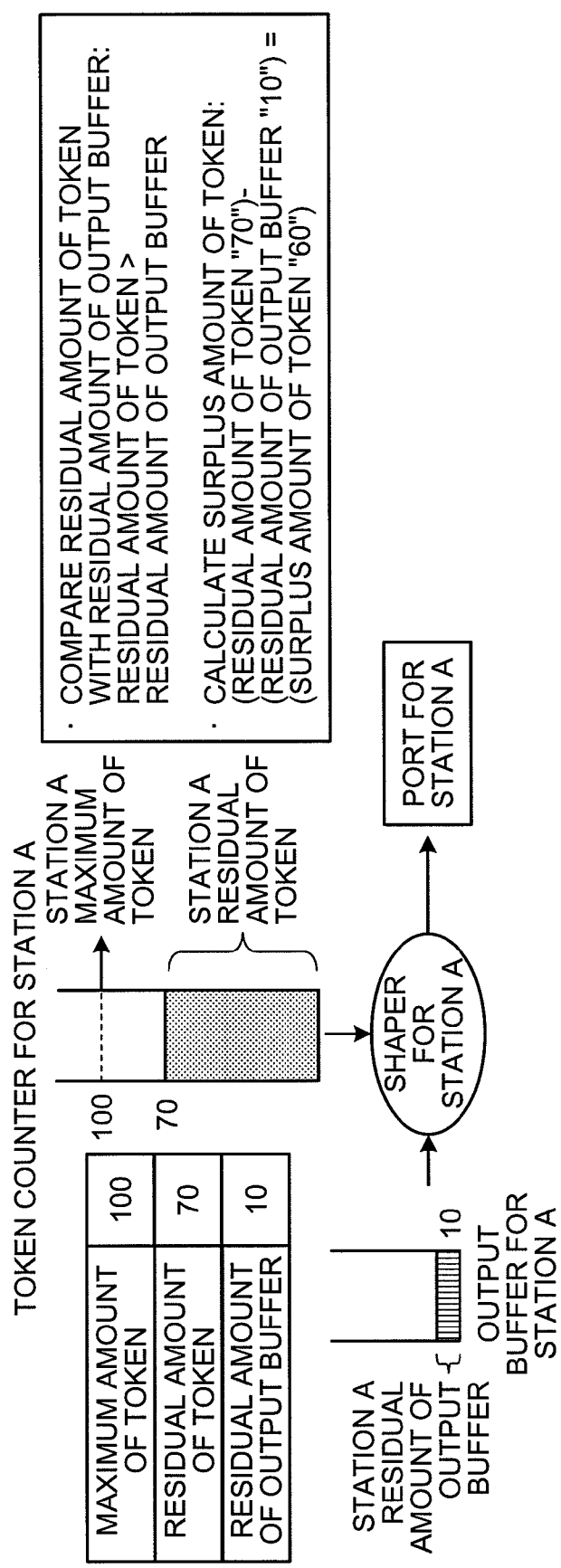

The bandwidth control system according to the first embodiment having the outline explained above is characterized mainly by effectively utilizing the token assigned to each of the stations for which the same user has a bandwidth contract. Briefly explaining the main features, the bandwidth control system according to the first embodiment calculates a surplus amount of token by subtracting a residual amount of output buffer from a residual amount of token for a station having the residual amount of output buffer smaller than the residual amount of token. As shown in FIG. 2, when the "residual amount of token" at a point after a predetermined time has elapsed is "70" and the "residual amount of output buffer" at the same point is "10" in the station A whose "maximum amount of token" being the amount of token to be distributed up to the maximum limit according to a contracted bandwidth is "100", the bandwidth control system according to the first embodiment calculates the "surplus amount of token" to be "60" by subtracting "10" being the "residual amount of output buffer" from "70" being the "residual amount of token" since the "residual amount of output buffer" is smaller than the "residual amount of token".

Figure 3:
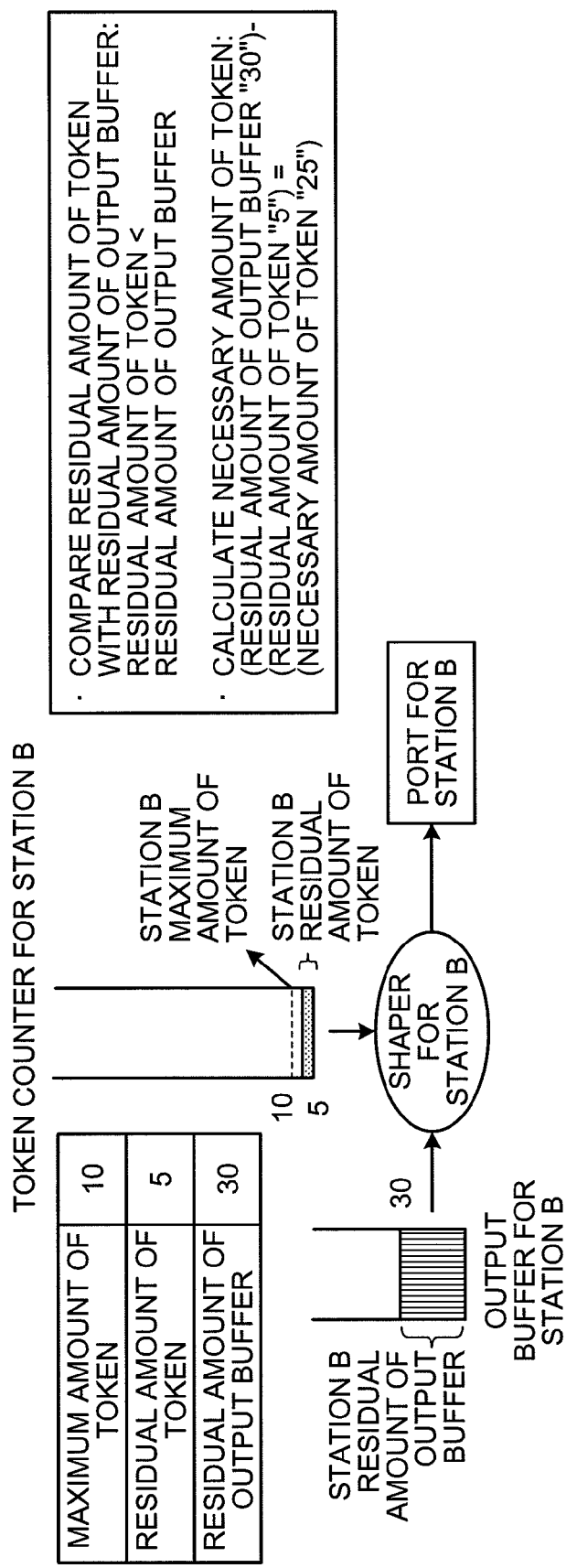

Furthermore, the bandwidth control system according to the first embodiment calculates a necessary amount of token by subtracting the residual amount of token from the residual amount of output buffer for a station in which the residual amount of output buffer is larger than the residual amount of token. As shown in FIG. 3, when the "residual amount of token" at a point after a predetermined time has elapsed (at the same time as the point shown in FIG. 2) is "5" and the "residual amount of output buffer" at the same point is "30" in the station B having the "maximum amount of token" of "10", the bandwidth control system according to the first embodiment calculates the "necessary amount of token" to be "25" by subtracting "5" being the "residual amount of token" from "30" being the "residual amount of output buffer" since the "residual amount of output buffer" is larger than the "residual amount of token".

Figure 4:
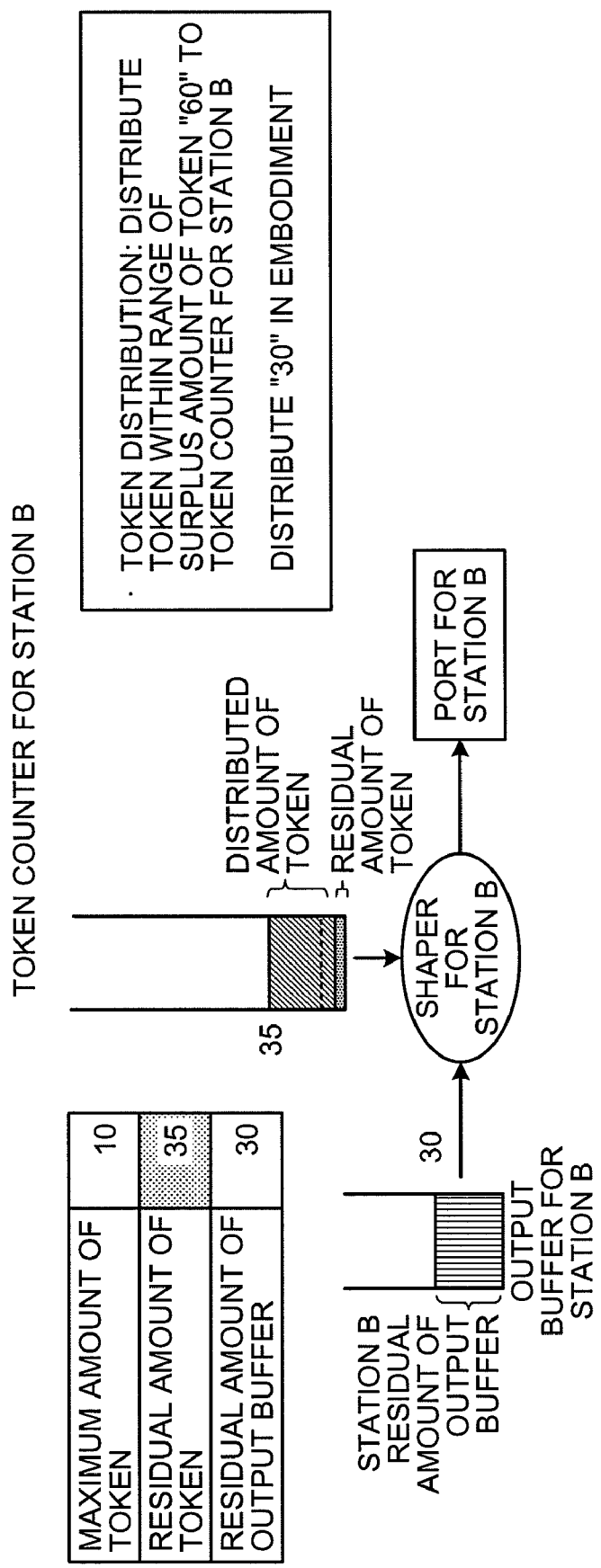

Subsequently, when the surplus amount of token and the necessary amount of token have been calculated between a plurality of stations for which the same user has a bandwidth contract, the bandwidth control system according to the first embodiment distributes an amount of token within a range of the surplus amount of token to a token counter of a station in which the necessary amount of token has been calculated from a station in which the surplus amount of token has been calculated. As shown in FIG. 4, since the "surplus amount of token" and the "necessary amount of token" have been respectively calculated in the station A and the station B for which the same user has a bandwidth contract, the bandwidth control system according to the first embodiment distributes an amount of token within the range of "60" being the "surplus amount of token" to the token counter of the station B. At this time it reduces the amount of token from the "residual amount of token" being in the "token counter for station A" and adds the amount of token within the range of the "surplus amount of token" to the "residual amount of token" being in the "token counter for station B".

That is, in the case shown in FIG. 4, the bandwidth control system according to the first embodiment distributes "30" being the amount of token within the range of the surplus amount of token "60" to the "token counter for station B" and the "residual amount of token" becomes "35". In this case, as shown in FIG. 5, the "residual amount of token" of the "token counter for station A" is reduced to "40".

In the above manner, the bandwidth control system according to the first embodiment can improve a state of transmission of packets by distributing the surplus amount of token calculated for the station A to the "token counter for station B" being not good in transmission of packets due to an insufficient residual amount of token, the station A and the station B having the same user, and can effectively utilize the token assigned to each of the stations for which the same user has a bandwidth contract.

Figure 6:
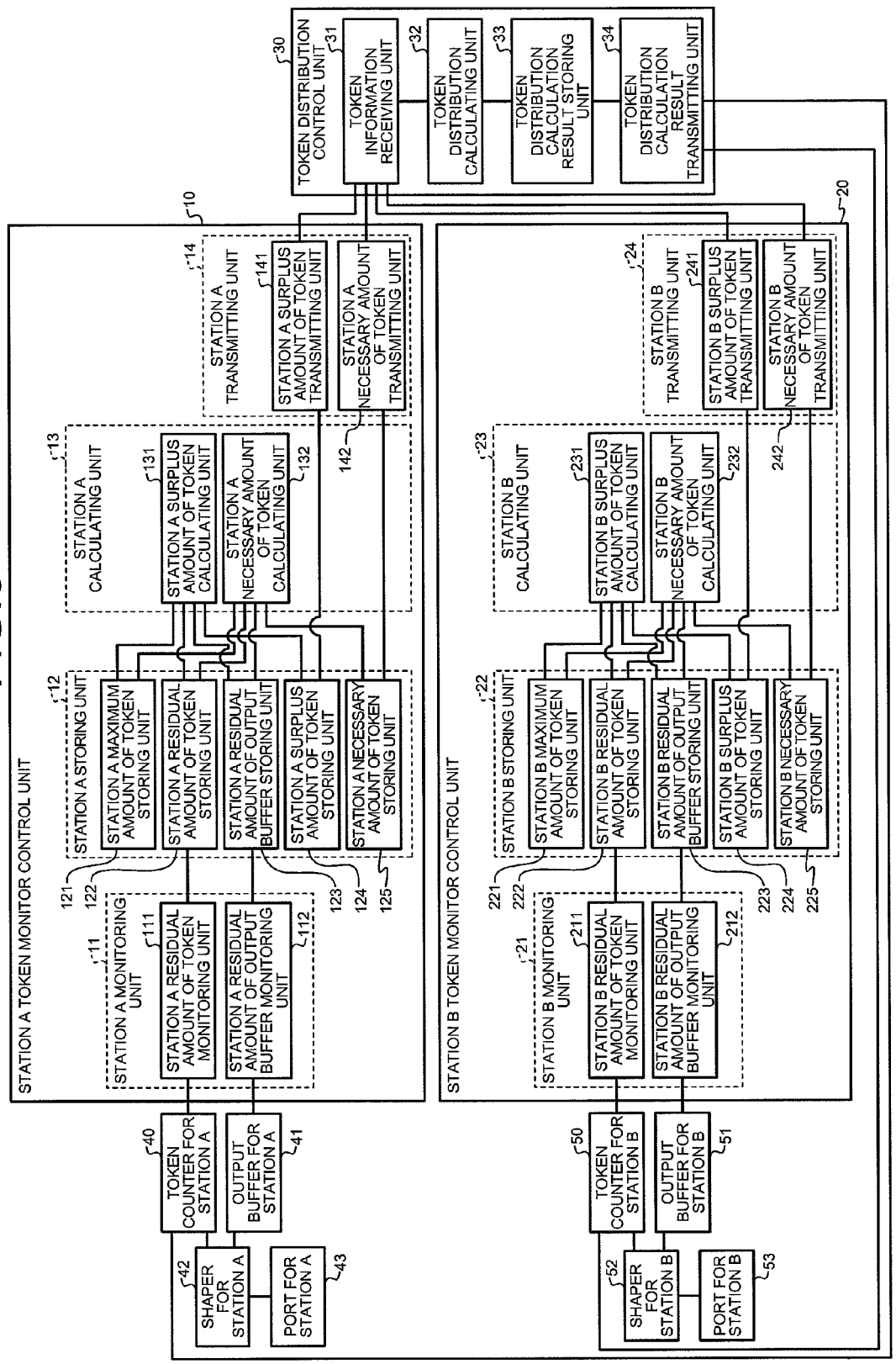
FIG. 6 is a block diagram showing a configuration of a bandwidth control system according to the first embodiment.

FIG. 6 is a block diagram illustrating a configuration of the bandwidth control system according to the first embodiment. FIGS. 7 and 8 are schematic diagrams for explaining a surplus amount of token calculating unit and a necessary amount of token calculating unit according to the first embodiment. FIGS. 9 and 10 are schematic diagrams for explaining a token distribution control unit according to the first embodiment.

As shown in FIG. 6, the bandwidth control system according to the first embodiment includes a station A token monitor control unit 10, a station B token monitor control unit 20, and a token distribution control unit 30. A token counter for station A 40 and an output buffer for station A 41 are connected to the station A token monitor control unit 10, and a token counter for station B 50 and an output buffer for station B 51 are connected to the station B token monitor control unit 20. A shaper for station A 42 is connected to the token counter for station A 40 and the output buffer for station A 41, and a shaper for station B 52 is connected to the token counter for station B 50 and the output buffer for station B 51. A port for station A 43 is connected to the shaper for station A 42, and a port for station B 53 is connected to the shaper for station B 52.

The token counter for station A 40 stores a token for permitting a transmission of a packet to the station A distributed from a repeater station for a packet communication and the output buffer for station A 41 stores untransmitted packets to the station A. The maximum amount of token assigned per unit time by the repeater station according to a contracted bandwidth of the station A (for example, a contract of a maximum downlink capacity of 100 Mbps) is distributed to the token counter for station A 40, and each time the transmission of an untransmitted packet to the station A stored in the output buffer of the station A is permitted, an amount of token corresponding to the capacity of a transmission-permitted packet is subtracted from the amount of token of the token counter for station A 40. An amount of token remaining in the token counter for station A 40 is determined as the "residual amount of token".

The shaper for station A 42 adjusts a transmission of a packet from the port for station A 43 to the station A based on the residual amount of token in the token counter for station A 40 and the capacity of the untransmitted packets stored in the output buffer for station A 41. When there is a sufficient amount of token for transmitting the untransmitted packets stored in the output buffer for station A 41 in the token counter for station A 40, the shaper for station A 42 sends the packets successively to the port for station A 43, and the port for station A 43 sends the packets to a receiver terminal of the station A. And when there is not a sufficient amount of token for transmitting the untransmitted packets stored in the output buffer for station A 41 in the token counter for station A 40, the shaper for station A 42 does not send the packets to the port for station A 43, but keeps the packets in a standby in the output buffer for station A 41.

The token counter for station B 50 corresponds to the token counter for station A 40, the output buffer for station B 51 corresponds to the output buffer for station A 41, the shaper for station B 52 corresponds to the shaper for station A 42, and the port for station B 53 corresponds to the port for station A 43, and they respectively function similarly to each other.

The station A token monitor control unit 10 includes a station A monitoring unit 11, a station A storing unit 12, a station A calculating unit 13, and a station A transmitting unit 14. Data of a surplus amount of token and a necessary amount of token of the station A calculated by the station A calculating unit 13 based on data obtained by the station A monitoring unit 11 are stored in the station A storing unit 12. The station A transmitting unit 14 transmits the data to the token distribution control unit 30.

The station A storing unit 12 stores a result of monitor by the station A monitoring unit 11, data used in various processes by the station A calculating unit 13, and various process results by the station A calculating unit 13, and includes a station A maximum amount of token storing unit 121, a station A residual amount of token storing unit 122, a station A residual amount of output buffer storing unit 123, a station A surplus amount of token storing unit 124, and a station A necessary amount of token storing unit 125 as units related particularly close to the present invention as shown in FIG. 6. The station A residual amount of token storing unit 122 stores a residual amount of token obtained by a station A residual amount of token monitoring unit 111 monitoring the token counter for station A 40. The station A residual amount of output buffer storing unit 123 stores a residual amount of output buffer obtained by a station A residual amount of output buffer monitoring unit 112 monitoring the output buffer for station A 41. The station A surplus amount of token storing unit 124 stores a surplus amount of token calculated by a station A surplus amount of token calculating unit 131. The station A necessary amount of token storing unit 125 stores a necessary amount of token calculated by a station A necessary amount of token calculating unit 132.

The station A monitoring unit 11 includes the station A residual amount of token monitoring unit 111 and the station A residual amount of output buffer monitoring unit 112 as units related particularly close to the present invention as shown in FIG. 6. The station A residual amount of token monitoring unit 111 monitors the token counter for station A 40, obtains a residual amount of token remaining in the token counter for station A 40, and stores the obtained residual amount of token in the station A residual amount of token storing unit 122. The station A residual amount of output buffer monitoring unit 112 monitors the output buffer for station A 41, obtains a residual amount of output buffer being a necessary amount of token for transmitting untransmitted packets stored in the output buffer for station A 41, and stores the obtained residual amount of output buffer in the station A residual amount of output buffer storing unit 123.

The station A calculating unit 13 calculates a surplus amount of token in the station A and a necessary amount of token in the station A each time a predetermined time has elapsed (for example, at intervals of 0.5 second), and includes the station A surplus amount of token calculating unit 131 and a station A necessary amount of token calculating unit 132 as units related particularly close to the present invention as shown in FIG. 6. The station A surplus amount of token calculating unit 131 corresponds to a "surplus amount of token calculating unit" set forth in the claims and the station A necessary amount of token calculating unit 132 corresponds to a "necessary amount of token calculating unit" in the same way.

The station A surplus amount of token calculating unit 131 calculates a surplus amount of token by subtracting the residual amount of output buffer from the residual amount of token for a station in which the residual amount of output buffer is smaller than the residual amount of token. As shown in a left table of FIG. 7 and a left table of FIG. 8, when the "residual amount of token" at a point after a predetermined time has elapsed is "70" and the "residual amount of output buffer is" 10 in the station A in which the "maximum amount of token" is "100" from the data stored in the station A maximum amount of token storing unit 121, the station A residual amount of token storing unit 122, and the station A residual amount of output buffer storing unit 123, since the "residual amount of output buffer" is smaller than the "residual amount of token", the surplus amount of token calculating unit 131 calculates the surplus amount of token to "60" by subtracting "10" being the "residual amount of output buffer" from "70" being the "residual amount of token".

The station A surplus amount of token calculating unit 131 stores the surplus amount of token together with the data used in the calculation in the station A surplus amount of token storing unit 124 as "station A surplus amount of token data".

The station A necessary amount of token calculating unit 132 calculates a necessary amount of token by subtracting the residual amount of token from the residual amount of output buffer for a station in which the residual amount of output buffer is larger than the residual amount of token. As shown in a left table of FIG. 7 and a left table of FIG. 8, since the "residual amount of output buffer" is smaller than the "residual amount of token" in station A, the station A necessary amount of token calculating unit 132 does not calculate the "necessary amount of token" (or calculates the "necessary amount of token" to be "0").

The station A necessary amount of token calculating unit 132 stores the necessary amount of token in the station A together with the data used in the calculation in the station A necessary amount of token storing unit 125 as "station A necessary amount of token data".

The station A transmitting unit 14 includes a station A surplus amount of token transmitting unit 141 and a station A necessary amount of token transmitting unit 142 as units related particularly close to the present invention as shown in FIG. 6.

The station A surplus amount of token transmitting unit 141 transmits data related to the surplus amount of token of the station A stored in the station A surplus amount of token storing unit 124 to a token information receiving unit 31. For example, the station A surplus amount of token transmitting unit 141 transmits the data to the token information receiving unit 31 each time the data related to the surplus amount of token of the station A is stored in the station A surplus amount of token storing unit 124.

The station A necessary amount of token transmitting unit 142 transmits data related to the necessary amount of token of the station A stored in the station A necessary amount of token storing unit 125 to the token information receiving unit 31. For example, the station A necessary amount of token transmitting unit 142 transmits the data to the token information receiving unit 31 each time the data related to the necessary amount of token of the station A is stored in the station A necessary amount of token storing unit 125.

The station B token monitor control unit 20 has a configuration similar to the station A token monitor control unit 10. A station B monitoring unit 21 corresponds to the station A monitoring unit 11, a station B storing unit 22 corresponds to the station A storing unit 12, a station B calculating unit 23 corresponds to the station A calculating unit 13, and a station B transmitting unit 24 corresponds to the station A transmitting unit 14, which respectively perform similar processings to the corresponding units.

The station B storing unit 22 has a similar configuration to the station A storing unit 12. A station B maximum amount of token storing unit 221 corresponds to the station A maximum amount of token storing unit 121, a station B residual amount of token storing unit 222 corresponds to the station A residual amount of token storing unit 122, a station B residual amount of output buffer storing unit 223 corresponds to the station A residual amount of output buffer storing unit 123, a station B surplus amount of token storing unit 224 corresponds to the station A surplus amount of token storing unit 124, and a station B necessary amount of token storing unit 225 corresponds to the station A necessary amount of token storing unit 125, which respectively function in similar manners to the corresponding units.

The station B monitoring unit 21 has a similar configuration to the station A monitoring unit 11. A station B residual amount of token monitoring unit 211 corresponds to the station A residual amount of token monitoring unit 111 and a station B residual amount of output buffer monitoring unit 212 corresponds to the station A residual amount of output buffer monitoring unit 112, which respectively function in similar manners to the corresponding units.

The station B calculating unit 23 calculates the surplus amount of token in the station B and the necessary amount of token in the station B each time a predetermined time has elapsed (for example, at intervals of 0.5 second), and includes a station B surplus amount of token calculating unit 231 and a station B necessary amount of token calculating unit 232 as units related particularly close to the present invention as shown in FIG. 6. The station B surplus amount of token calculating unit 231 corresponds to a "surplus amount of token calculating unit" set forth in the claims and the station B necessary amount of token calculating unit 232 corresponds to a "necessary amount of token calculating unit" in the same way.

The station B necessary amount of token calculating unit 232 calculates the necessary amount of token by subtracting the residual amount of token from the residual amount of output buffer for a station in which the residual amount of output buffer is larger than the residual amount of token. As shown in a right table of FIG. 7, when the "residual amount of token" at a point after a predetermined time has elapsed is "5" and the "residual amount of output buffer at the same point is "30" in the station B in which the "maximum amount of token" is "10", since the "residual amount of output buffer" is larger than the "residual amount of token" from data stored in the station B maximum amount of token storing unit 221, the station B residual amount of token storing unit 222, and the station B residual amount of output buffer storing unit 223, the station B necessary amount of token calculating unit 232 calculates the "necessary amount of token" to be "25" by subtracting "5" being the "residual amount of token" from "30" being the "residual amount of output buffer".

As shown in a right table of FIG. 8, when the "residual amount of token" at a point after a predetermined time has elapsed is "5" and the "residual amount of output buffer" at the same point is "70" in the station B in which the "maximum amount of token" is "10" from data stored in the station B maximum amount of token storing unit 221, the station B residual amount of token storing unit 222, and the station B residual amount of output buffer storing unit 223, since the "residual amount of output buffer" is larger than the "residual amount of token", the station B necessary amount of token calculating unit 232 calculates the "necessary amount of token" to be "65" by subtracting "5" being the "residual amount of token" from "70" being the "residual amount of output buffer".

The station B necessary amount of token calculating unit 232 stores the necessary amount of token in the station B together with the data used in the calculation in the station B necessary amount of token storing unit 225 as "station B necessary amount of token data".

The station B surplus amount of token calculating unit 231 calculates the surplus amount of token by subtracting the residual amount of token from the maximum amount of token indicating an amount of token to be distributed up to the maximum limit according to a contracted bandwidth of a station in which the residual amount of output buffer indicating the necessary amount of token for transmitting the untransmitted packets stored in the output buffer is smaller than the residual amount of token. As shown in a right table of FIG. 7 and a right table of FIG. 8, since the "residual amount of output buffer" is larger than the "residual amount of token" in station B, the station B surplus amount of token calculating unit 231 does not calculate the "surplus amount of token" (or calculates the "surplus amount of token" to be "0").

The station B surplus amount of token calculating unit 231 stores the surplus amount of token in the station B together with the data used in the calculation in the station B surplus amount of token storing unit 224 as "station B surplus amount of token data".

The station B transmitting unit 24 has a similar configuration to the station A transmitting unit 14. A station B surplus amount of token transmitting unit 241 corresponds to the station A surplus amount of token transmitting unit 141 and a station B necessary amount of token transmitting unit 242 corresponds to the station A necessary amount of token transmitting unit 142, which respectively function in similar manners to the corresponding units.

The token distribution control unit 30 receives data that the station A transmitting unit 14 and the station B transmitting unit 24 transmit each time a predetermined time elapses to perform a distribution control of the token, and includes the token information receiving unit 31, a token distribution calculating unit 32, a token distribution calculation result storing unit 33, and a token distribution calculation result transmitting unit 34 as units related particularly close to the present invention as shown in FIG. 6. The token distribution calculating unit 32 corresponds to a "token distributing unit" set forth in the claims.

The token information receiving unit 31 receives data that the station A transmitting unit 14 and the station B transmitting unit 24 transmit each time a predetermined time elapses. The token information receiving unit 31 receives "station A surplus amount of token data" from the station A surplus amount of token transmitting unit 141, "station A necessary amount of token data" from the station A necessary amount of token transmitting unit 142, "station B surplus amount of token data" from the station B surplus amount of token transmitting unit 241, and "station B necessary amount of token data" from the station B necessary amount of token transmitting unit 242.

In the case shown in FIG. 7, the token information receiving unit 31 receives data including the "maximum amount of token: 100", the "residual amount of token: 70", the "residual amount of output buffer: 10", and the "surplus amount of token: 60" as the "station A surplus amount of token data" from the station A surplus amount of token transmitting unit 141, data of calculating no "necessary amount of token" (or of setting the "necessary amount of token" as "0") as the "station A necessary amount of token data" from the station A necessary amount of token transmitting unit 142, data of calculating no "surplus amount of token" (or of setting the "surplus amount of token" as "0") as the "station B surplus amount of token data" from the station B surplus amount of token transmitting unit 241, and data including the "maximum amount of token: 10", the "residual amount of token: 5", the "residual amount of output buffer: 30", and the "necessary amount of token: 25" as the "station B necessary amount of token data" from the station B necessary amount of token transmitting unit 242.

In the case shown in FIG. 8, the token information receiving unit 31 receives the same data as described above in FIG. 7 as the "station A surplus amount of token data" from the station A surplus amount of token transmitting unit 141, the same data as described above in FIG. 7 as the "station A necessary amount of token data" from the station A necessary amount of token transmitting unit 142, data of calculating no "surplus amount of token" (or of setting the "surplus amount of token" as "0") as the "station B surplus amount of token data" from the station B surplus amount of token transmitting unit 241, and data including the "maximum amount of token: 10", the "residual amount of token: 5", the "residual amount of output buffer: 70", and the "necessary amount of token: 65" as the "station B necessary amount of token data" from the station B necessary amount of token transmitting unit 242.

When the surplus amount of token and the necessary amount of token have been calculated between a plurality of stations for which the same user has a bandwidth contract, the token distribution calculating unit 32 calculates an amount of token to be distributed within the range of the surplus amount of token for a token counter of a station in which the necessary amount of token has been calculated from a station in which the surplus amount of token has been calculated. When the "surplus amount of token" and the "necessary amount of token" have been calculated in the station A and the station B for which the same user has a bandwidth contract from data that the token information receiving unit 31 has received, as shown in FIG. 9, the token distribution calculating unit 32 performs a calculation to distribute an amount of token within the range of "60" being the "surplus amount of token" to the token counter for station B 50. For example, according to the first embodiment, the token distribution calculating unit 32 performs a calculation to distribute "30" being the amount of token within the range of "60" being the "surplus amount of token".

When the "surplus amount of token" and the "necessary amount of token" have been calculated in the station A and the station B for which the same user has a bandwidth contract, as shown in FIG. 10, the token distribution calculating unit 32 does not perform an operation to distribute an amount of token "65" being the "necessary amount of token" but performs a calculation to distribute an amount of token within the range of "60" being the "surplus amount of token". For example, according to the first embodiment, the token distribution calculating unit 32 performs a calculation to distribute "30" being the amount of token within the range of "60" being the "surplus amount of token".

The token distribution calculation result storing unit 33 stores a result of the operation of the token distribution calculating unit 32. The token distribution calculation result transmitting unit 34 transmits a result stored in the token distribution calculation result storing unit 33 and adds or subtracts the amount of token in the token counter for station A 40 and the token counter for station B 50.

Explaining with the examples shown in FIGS. 7 and 8, as shown in FIGS. 9 and 10, the token distribution calculation result transmitting unit 34 transmits a result of distributing an amount of token "30" from the token counter for station A 40 to the token counter for station B 50, reduces the residual amount of token of the token counter for station A 40 to "40", and increases the residual amount of token of the token counter for station B 50 to "35".

FIG. 11 is a flowchart of a process performed by the token distribution control unit 30.

When the token distribution control unit 30 receives surplus amount of token data and necessary amount of token data in each of the stations for which the same user has a bandwidth contract (Yes at step S501), the token distribution control unit 30 judges whether the surplus amount of token and the necessary amount of token have been calculated between the stations for which the same user has a bandwidth contract (step S502).

When each time a predetermined time elapses, the token information receiving unit 31 receives "station A surplus amount of token data" and "station A necessary amount of token data" respectively from the station A surplus amount of token transmitting unit 141 and the station A necessary amount of token transmitting unit 142, and "station B surplus amount of token data" and "station B necessary amount of token data" respectively from the station B surplus amount of token transmitting unit 241 and the station B necessary amount of token transmitting unit 242. The token distribution calculating unit 32 judges whether the surplus amount of token and the necessary amount of token have been calculated based on the data that the token information receiving unit 31 has received.

When the surplus amount of token and the necessary amount of token have not been calculated between the stations for which the same user has a bandwidth contract (No at step S502), the processing is ended. For example, when a surplus amount of token has been calculated in each of the station A and station B or when a necessary amount of token has been calculated in each of the station A and station B, the processing is ended. On the contrary, when a surplus amount of token and a necessary amount of token have been calculated among a plurality of stations each of which the user has a bandwidth contract for (Yes at step S502), an amount of token within the range of surplus amount of token is distributed to a token counter of a station in which the necessary amount of token has been calculated (step S503) and the processing is ended.

Concretely, since a surplus amount of token has been calculated in station A and a necessary amount of token has been calculated in station B from surplus amount of token data and necessary amount of token data for each station shown in FIG. 7, the token distribution calculating unit 32 performs a calculation to distribute an amount of token within the range of surplus amount of token "60" calculated in station A to the token counter for station B 50, the token distribution calculation result storing unit 33 stores the result of operation of the token distribution calculating unit 32, and the token distribution calculation result transmitting unit 34 transmits the result stored in the token distribution calculation result storing unit 33 and adds or subtracts the amount of token of the token counter for station A 40 and the token counter for station B 50. For example, in the case shown in FIG. 7, as shown in FIG. 9, the token distribution calculation result transmitting unit 34 reduces the amount of token of the token counter for station A 40 by "30" to be "40" and increases the amount of token of the token counter for station B 50 by "30" to be "35".

As described above, according to the first embodiment, since the system calculates a surplus amount of token obtained by subtracting a residual amount of output buffer from a residual amount of token for a station in which the residual amount of output buffer is smaller than the residual amount of token, calculates a necessary amount of token obtained by subtracting a residual amount of token from a residual amount of output buffer for a station in which the residual amount of output buffer is larger than the residual amount of token, and distributes an amount of token within the range of surplus amount of token to a token counter of a station in which the necessary amount of token has been calculated from a station in which the surplus amount of token has been calculated when the surplus amount of token and the necessary amount of token have been calculated among a plurality of stations each of which the same user has a bandwidth contract for, it is possible to improve the state of packet transmission by distributing a surplus amount of token calculated in station A to the token counter for station B 50 being not good in packet transmission due to being insufficient in residual amount of token, the station A and station B having the same user, and to effectively utilize an amount of token assigned to each of a plurality of stations each of which the same user has a bandwidth contract for.

While the case of distributing an amount of token within the range of surplus amount of token has been explained in the first embodiment, a second embodiment of the present invention explains a case of distributing an amount of token within the range of surplus amount of token to a token counter of a station in which a necessary amount of token has been calculated so that the amount of token after distribution is equal to or smaller than the upper threshold value of the station.

Figure 13:
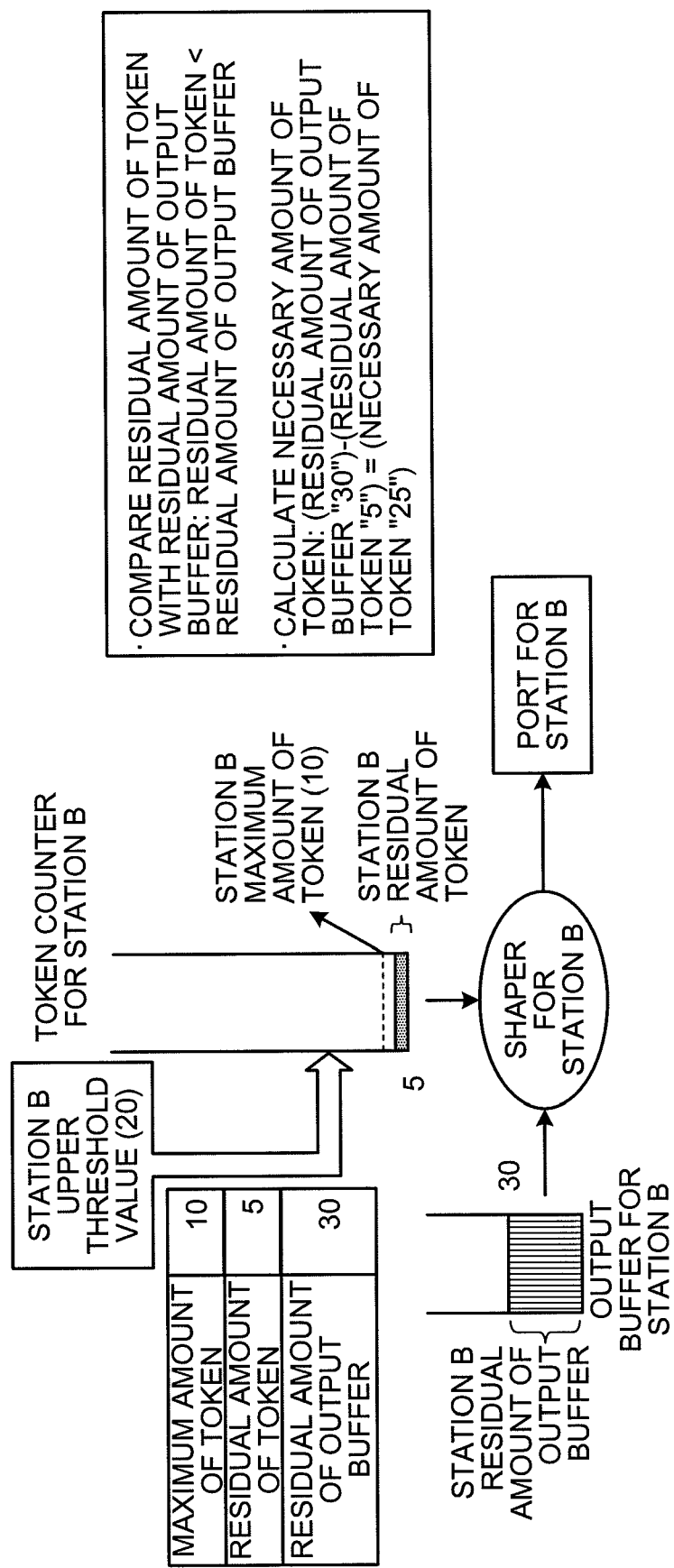
Figure 14:
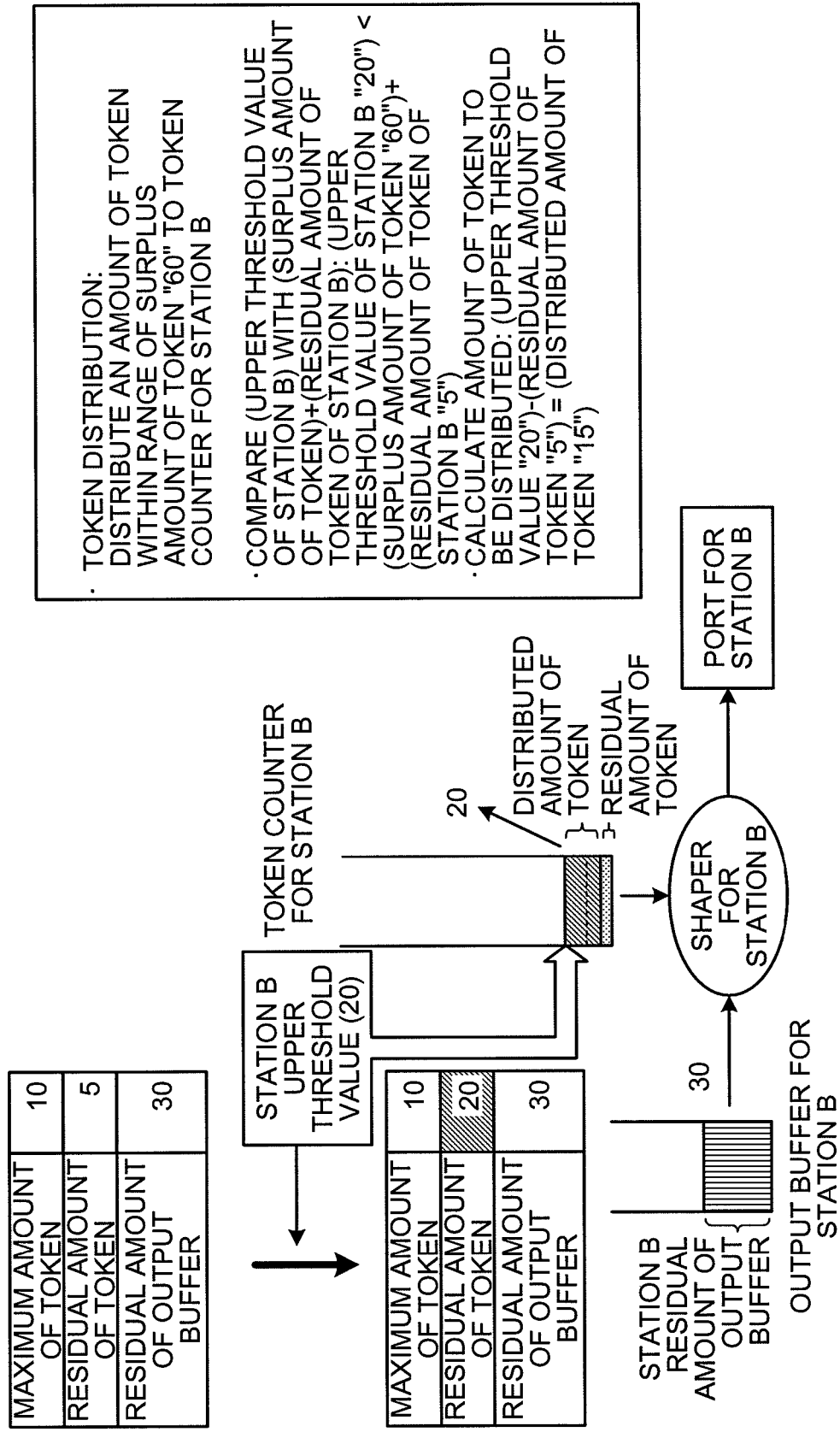

FIGS. 12 to 14 are schematic diagrams for explaining an outline and features of a bandwidth control system according to the second embodiment.

In a similar manner to the bandwidth control system according to the first embodiment, the bandwidth control system according to the second embodiment first calculates a surplus amount of token for a station in which a residual amount of output buffer is smaller than a residual amount of token and calculates a necessary amount of token for a station in which a residual amount of output buffer is larger than a residual amount of token.

As shown in FIG. 12, when a "residual amount of token" at a point after a predetermined time has elapsed is "70" and a "residual amount of output buffer" is "10" at the same point in station A in which the "maximum amount of token" is "100", since the "residual amount of output buffer" is smaller than the "residual amount of token", the system calculates the "surplus amount of token" to be "60" by subtracting "10" being the "residual amount of output buffer" from "70" being the "residual amount of token". And as shown in FIG. 13, when a "residual amount of token" at a point after a predetermined time has elapsed (at the same time as the point shown in FIG. 12) is "5" and a "residual amount of output buffer" is "30" at the same point in station B in which the "maximum amount of token" is "10", since the "residual amount of output buffer" is larger than the "residual amount of token", the bandwidth control system according to the second embodiment calculates the "necessary amount of token" to be "25" by subtracting "5" being the "residual amount of token" from "30" being the "residual amount of output buffer".

Subsequently, the bandwidth control system according to the second embodiment stores an upper threshold value indicating the upper limit amount of token after distribution for each of a plurality of stations each of which the same user has a bandwidth contract for and distributes an amount of token within the range of surplus amount of token to a token counter of a station in which the necessary amount of token has been calculated so that an amount of token after distribution is equal to or smaller than the upper threshold value of the station. That is, the system distributes an amount of token as shown in FIG. 14 while adding the information that the upper threshold value of the station A is "100" as shown in FIG. 12 and the upper threshold value of the station B is "20" as shown in FIG. 13.

Since the "surplus amount of token" and the "necessary amount of token" are calculated in each of the station A and station B each of which the same user has a bandwidth contract for, the system distributes an amount of token within the range of "60" being the "surplus amount of token" so that the amount of token after distribution is equal to or smaller than the upper threshold value "20" of the station B. More concretely, since the amount of token of the station B becomes "65" by adding "60" being the "surplus amount of token" to "5" being the "residual amount of token" of the station Bandwidth becomes larger than the upper threshold value "20" of the station B, the system distributes an amount of token equal to or smaller than "15" obtained by subtracting "5" being the "residual amount of token" of the station B from the upper threshold value "20" of the station B to the token counter for station B. In the embodiment, as shown in FIG. 14, the residual amount of token of the token counter of the station B increases by "15" to become "20" by having "15" being the upper limit value distributed. Although not shown in the figures, the residual amount of token of the token counter for station A decreases by "15" to become "55". That is, since station A in which the surplus amount of token has been calculated to be "60" delivers the amount of token of only "15" to the token counter for station B, station A comes into a state in which it has the amount of token in reserve and thereby a relation of superiority or inferiority with respect to the guarantee of bandwidth occurs between the stations.

From the above aspect, the bandwidth control system according to the second embodiment can set priorities based on the upper threshold values among a plurality of stations each of which the same user has a bandwidth contract for and makes it possible to effectively utilize an amount of token according to the degree of importance among a plurality of stations each of which the same user has a bandwidth contract for.

Figure 15:
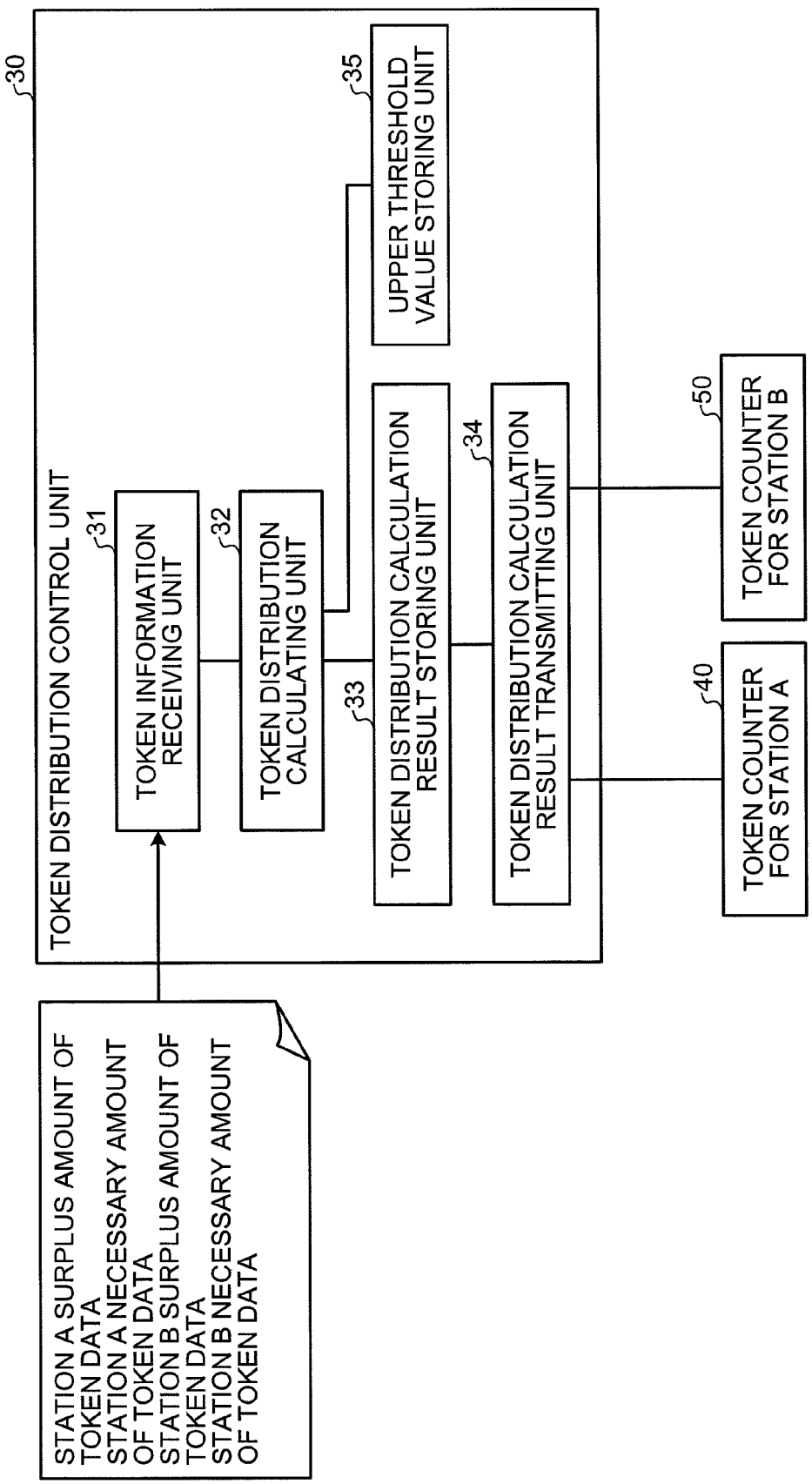
FIG. 15 is a block diagram showing a configuration of a bandwidth control system according to the second embodiment.
Figure 18:
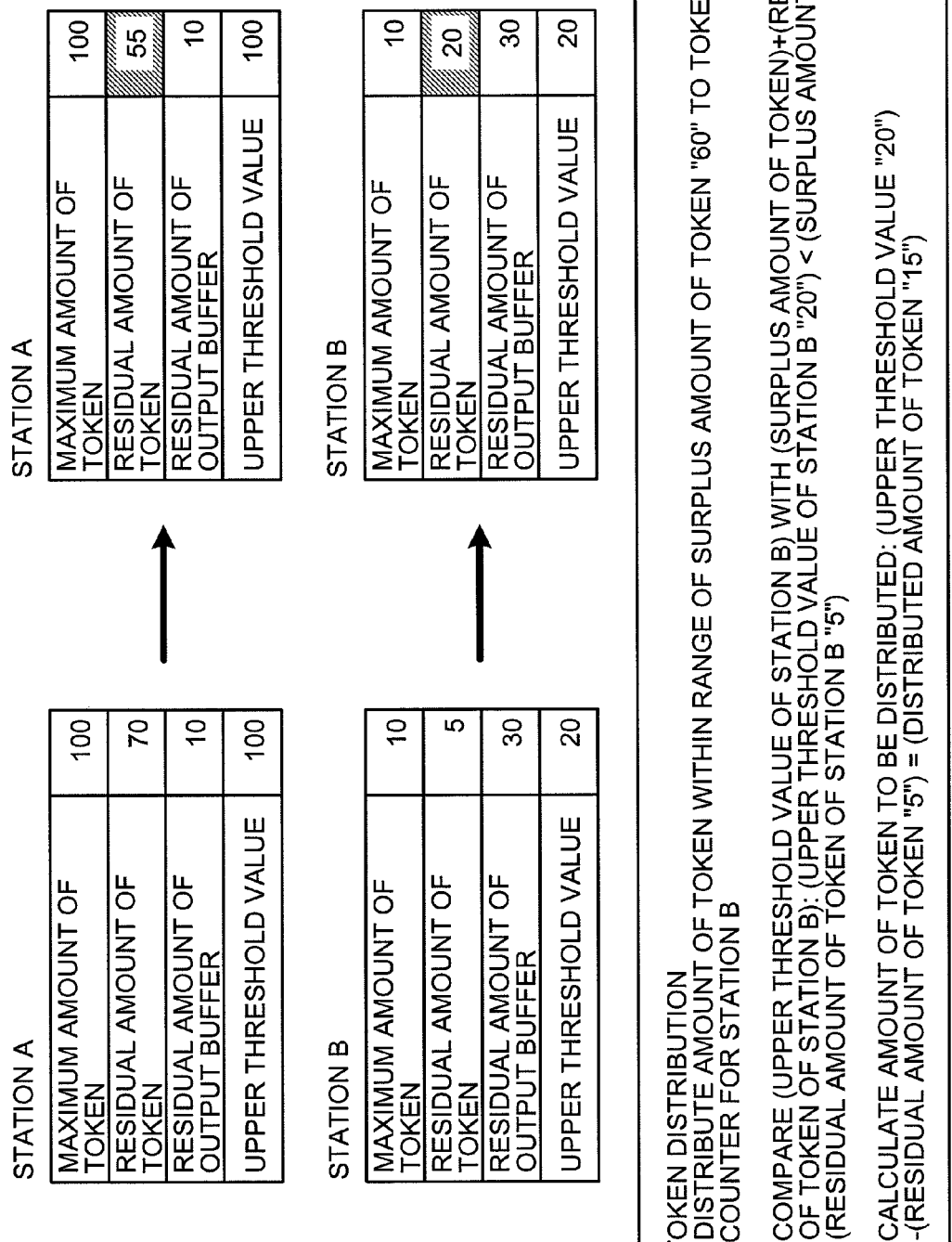
FIG. 18 is a schematic diagram for explaining a token distribution control unit according to the second embodiment.

FIG. 15 is a block diagram showing a configuration of the bandwidth control system according to the second embodiment. FIGS. 16 and 17 are schematic diagrams for explaining a surplus amount of token calculating unit and a necessary amount of token calculating unit according to the second embodiment. FIG. 18 is a schematic diagram for explaining a token distribution control unit according to the second embodiment.

As shown in FIG. 15, the bandwidth control system according to the second embodiment is fundamentally similar to but different from the bandwidth control system according to the first embodiment in that the token distribution control unit 30 is newly provided with an upper threshold value storing unit 35. The upper threshold value storing unit 35 corresponds to an "upper threshold value storing unit" set forth in the claims.

The token information receiving unit 31 receives data that the station A transmitting unit 14 and the station B transmitting unit 24 transmit each time a predetermined time elapses. Concretely, it receives "station A surplus amount of token data" from the station A surplus amount of token transmitting unit 141, receives "station A necessary amount of token data" from the station A necessary amount of token transmitting unit 142, receives "station B surplus amount of token data" from the station B surplus amount of token transmitting unit 241, and receives "station B necessary amount of token data" from the station B necessary amount of token transmitting unit 242.

Specifically, in the case shown in FIG. 16, the token information receiving unit 31 receives data consisting of the "maximum amount of token: 100", a "residual amount of token: 70", a "residual amount of output buffer: 10", and a "surplus amount of token: 60" as "station A surplus amount of token data" from the station A surplus amount of token transmitting unit 141, and receives data of calculating no "necessary amount of token" (or of setting a "necessary amount of token" as "0") as "station A necessary amount of token data" from the station A necessary amount of token transmitting unit 142. And in case of FIG. 17, it receives data of calculating no "surplus amount of token" (or of setting a "surplus amount of token" as "0") as "station B surplus amount of token data" from the station B surplus amount of token transmitting unit 241, and receives data consisting of the "maximum amount of token: 10", a "residual amount of token: 5", a "residual amount of output buffer: 30", and a "necessary amount of token: 25" as "station B necessary amount of token data" from the station B necessary amount of token transmitting unit 242.

The upper threshold value storing unit 35 stores an upper threshold value indicating the upper limit amount of token after distribution for each of a plurality of stations each of which the same user has a bandwidth contract for, and the token distribution calculating unit 32 calculates an amount of token to be distributed within the range of surplus amount of token to a token counter of a station in which the necessary amount of token has been calculated so that the amount of token after distribution is equal to or smaller than the upper threshold value of the station stored in the upper threshold value storing unit 35.

As shown in FIG. 18, the token distribution calculating unit 32 calculates an amount of token to be distributed while adding the information that the upper threshold value of the station A stored in the upper threshold value storing unit 35 is "100" and the upper threshold value of the station B is "20".

Since the "surplus amount of token" and the "necessary amount of token" are calculated, respectively, in the station A and the station B each of which the same user has a bandwidth contract for, the system distributes an amount of token within the range of "60" being the "surplus amount of token" to the token counter for station B 50 so that the amount of token after distribution is equal to or smaller than the upper threshold value "20" of the station B. Hereupon, since the amount of token of the station B becomes "65" by adding "60" being the "surplus amount of token" to "5" being the "residual amount of token" of the station Bandwidth becomes larger than the upper threshold value "20" of the station B, the system performs a calculation to distribute an amount of token equal to or smaller than "15" obtained by subtracting "5" being the "residual amount of token" of the station B from the upper threshold value "20" of the station B to the token counter for station Bandwidth for example, in the embodiment, performing a calculation to distribute "15" being the upper limit value to the token counter for station B, as shown in FIG. 18 the token distribution calculation result transmitting unit 34 transmits the result, reduces the residual amount of token of the token counter for station A 40 by "15" to be "55", and increases the residual amount of token of the token counter for station B 50 by "15" to be "20".

Figure 19:
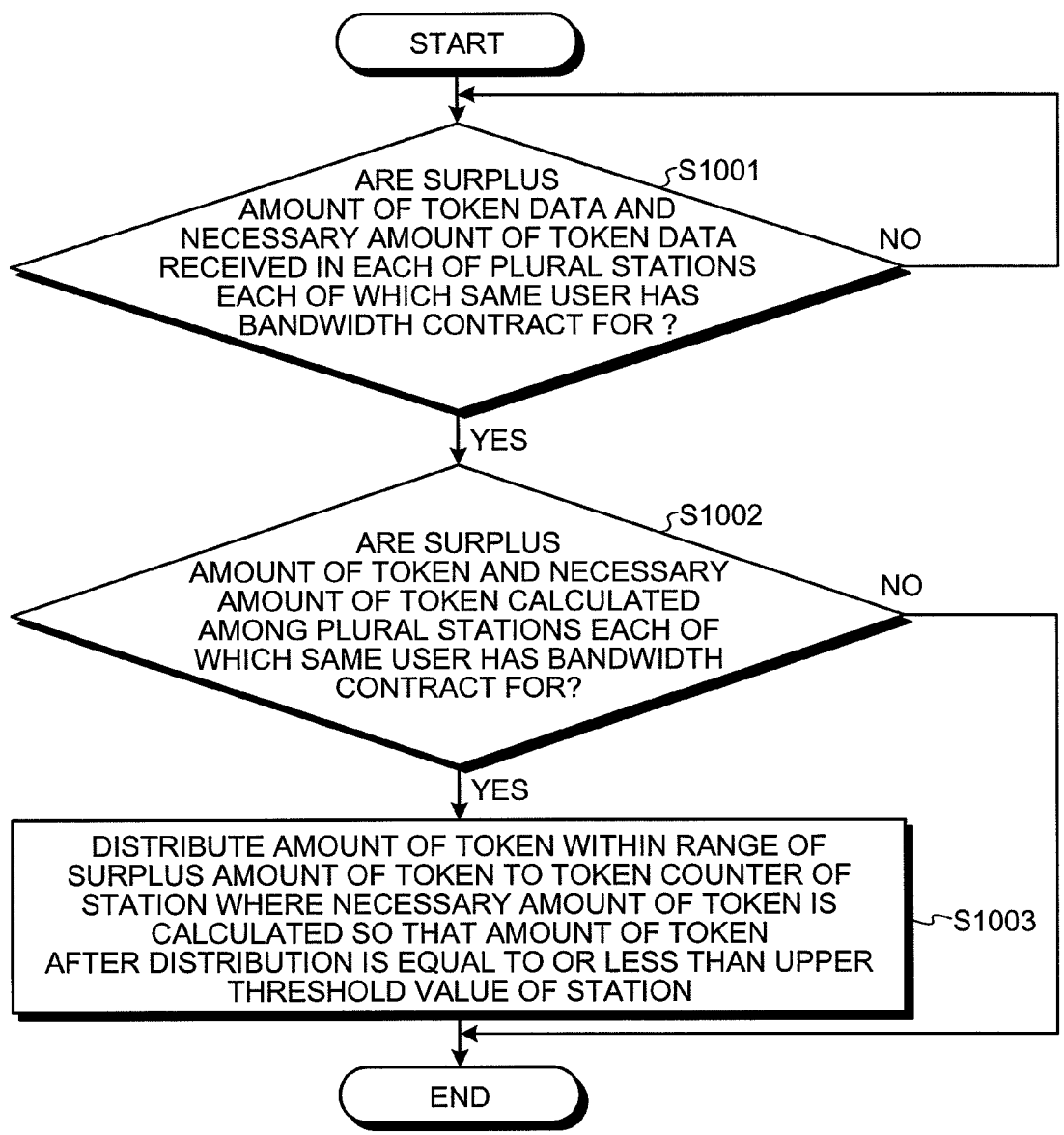
FIG. 19 is a flowchart of a token distribution control process according to the second embodiment.

FIG. 19 is a flowchart of a processing procedure performed by the token distribution control unit according to the second embodiment.

First, when the token distribution control unit 30 according to the second embodiment receives surplus amount of token data and necessary amount of token data in each of a plurality of stations each of which the same user has a bandwidth contract for (Yes at step S1001), it judges whether a surplus amount of token and a necessary amount of token have been calculated among a plurality of stations each of which the same user has a bandwidth contract for (step S1002).

When the surplus amount of token and the necessary amount of token have not been calculated among the stations each of which the same user has a bandwidth contract for (No at step S1002), the processing is ended. For example, when a surplus amount of token has been calculated in each of the station A and station B or when a necessary amount of token has been calculated in each of the station A and station B, the processing is ended. On the contrary, when the surplus amount of token and the necessary amount of token have been calculated among a plurality of stations each of which the user has a bandwidth contract for (Yes at step S1002), an amount of token within the range of surplus amount of token is distributed to a token counter of a station in which the necessary amount of token has been calculated so that the amount of token after distribution is equal to or smaller than the upper threshold value of the station (step S1003), and the processing is ended.

Since a surplus amount of token has been calculated in station A as shown in FIG. 16 and a necessary amount of token has been calculated in station B as shown in FIG. 17, the token distribution calculating unit 32 performs a calculation to distribute an amount of token being equal to or smaller than "15" satisfying the condition that the amount of token after distribution is equal to or smaller than the upper threshold value "20" of the station B to the token counter for station B 50. And in the embodiment, as shown in FIG. 18, to distribute "15" being the upper limit value, the token distribution calculation result transmitting unit 34 reduces the residual amount of token of the token counter for station A 40 by "15" to be "55" and increases the amount of token of the token counter for station B 50 by "15" to be "20".

As described above, according to the second embodiment, since the system stores an upper threshold value indicating the upper limit amount of token after distribution for each of a plurality of stations each of which the same user has a bandwidth contract for and distributes an amount of token within the range of surplus amount of token to a token counter of a station in which a necessary amount of token has been calculated so that the amount of token after distribution is equal to or smaller than the upper threshold value of the station, it is possible to set priorities based on the upper threshold values among a plurality of stations each of which the same user has a bandwidth contract for and to effectively utilize an amount of token according to the degree of importance among the stations each of which the same user has a bandwidth contract for.

While the first and the second embodiments described above do not distribute an amount of token when a necessary amount of token has been calculated in each of a plurality of stations each of which the same user has a bandwidth contract for, it is explained that a third embodiment of the present invention distributes an amount of token to a high-priority station when a necessary amount of token has been calculated in each of a plurality of stations each of which the same user has a bandwidth contract for.

Figure 20:
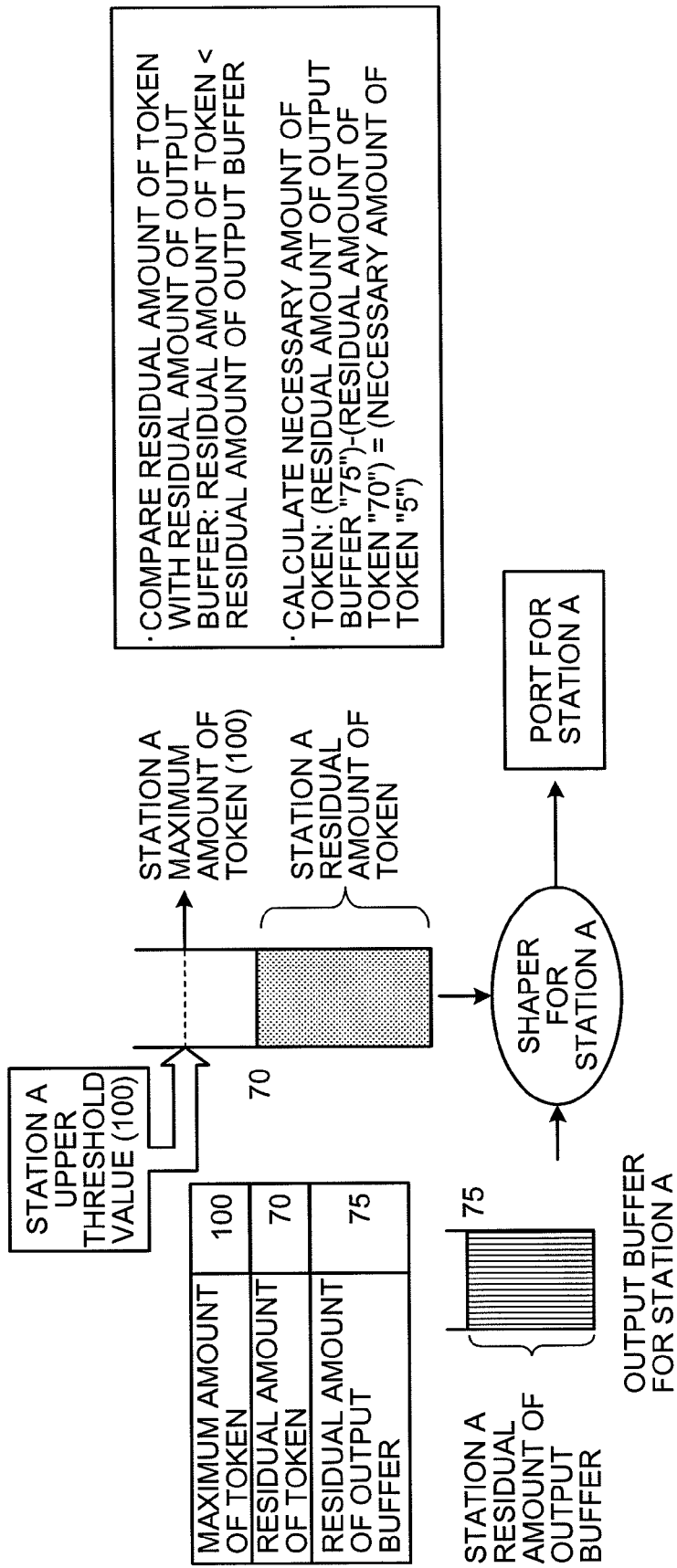
FIGS. 20 to 22 are schematic diagrams for explaining an outline and features of a bandwidth control system according to a third embodiment of the present invention.
Figure 21:
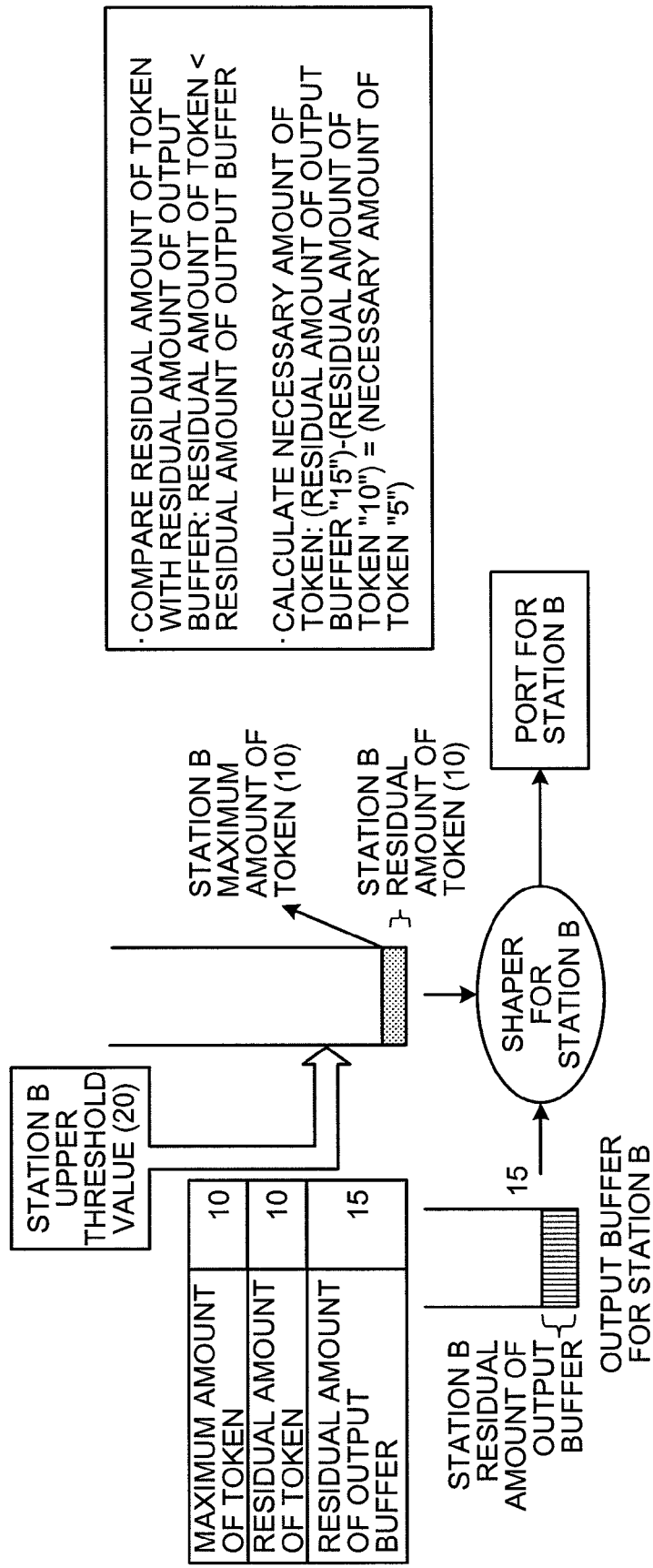
Figure 22:
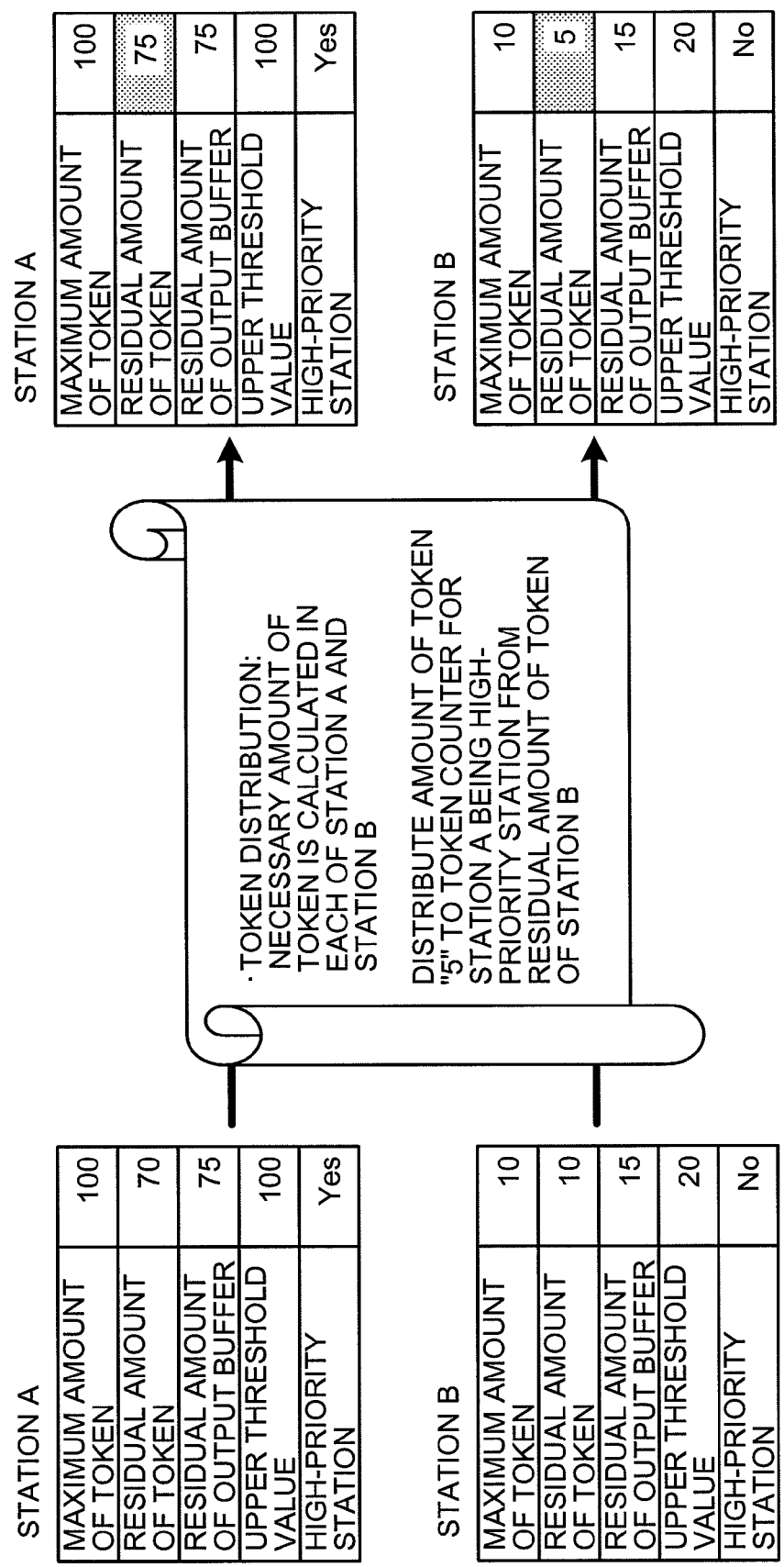

FIGS. 20 to 22 are schematic diagrams for explaining an outline and features of the bandwidth control system according to the third embodiment.

In a similar manner to the bandwidth control system according to the first embodiment, the bandwidth control system according to the third embodiment first calculates a surplus amount of token for a station in which a residual amount of output buffer is smaller than a residual amount of token and calculates a necessary amount of token for a station in which a residual amount of output buffer is larger than a residual amount of token.

As shown in FIG. 20, when a "residual amount of token" at a point after a predetermined time has elapsed is "70" and a "residual amount of output buffer" is "75" at the same point in station A in which the "maximum amount of token" is "100", since the "residual amount of output buffer" is larger than the "residual amount of token", the system calculates the "necessary amount of token" to be "5" by subtracting "70" being the "residual amount of token" from "75" being the "residual amount of output buffer". And as shown in FIG. 21, when a "residual amount of token" at a point after a predetermined time has elapsed (at the same time as the point shown in FIG. 20) is "10" and a "residual amount of output buffer" at the same point is "15" in station B in which the "maximum amount of token" is "10", since the "residual amount of output buffer" is larger than the "residual amount of token", the system calculates the "necessary amount of token" to be "10" by subtracting "10" being the residual amount of token" from "15" being the "residual amount of output buffer".

Subsequently, the bandwidth control system according to the third embodiment sets and stores a high-priority station indicating a station being higher in priority among a plurality of stations each of which the same user has a bandwidth contract for and, when a necessary amount of token has been calculated in each of the stations each of which the same user has a bandwidth contract for, distributes an amount of token to a token counter of the high-priority station from a residual amount of token in a low-priority station other than the high-priority station. Concretely, when a necessary amount of token has been calculated in each of the station A and station B as shown in FIGS. 20 and 21, the system distributes an amount of token "5" to the token counter of the station A set as a high-priority station from the residual amount of token of the station B being a low-priority station, as shown in FIG. 22. As a result, as shown in FIG. 22, the amount of token of the token counter for station A increases to "75" and the amount of token of the token counter for station B decreases to "5".

From the above aspect, even when a necessary amount of token occurs in each of a plurality of station each of which the same user has a bandwidth contract for and thereby token demands compete with one another, the bandwidth control system according to the third embodiment can deliver an amount of token to a high-priority station from a low-priority station and makes it possible to effectively utilize an amount of token according to the degree of importance among the stations each of which the same user has a bandwidth contract for.

Figure 23:
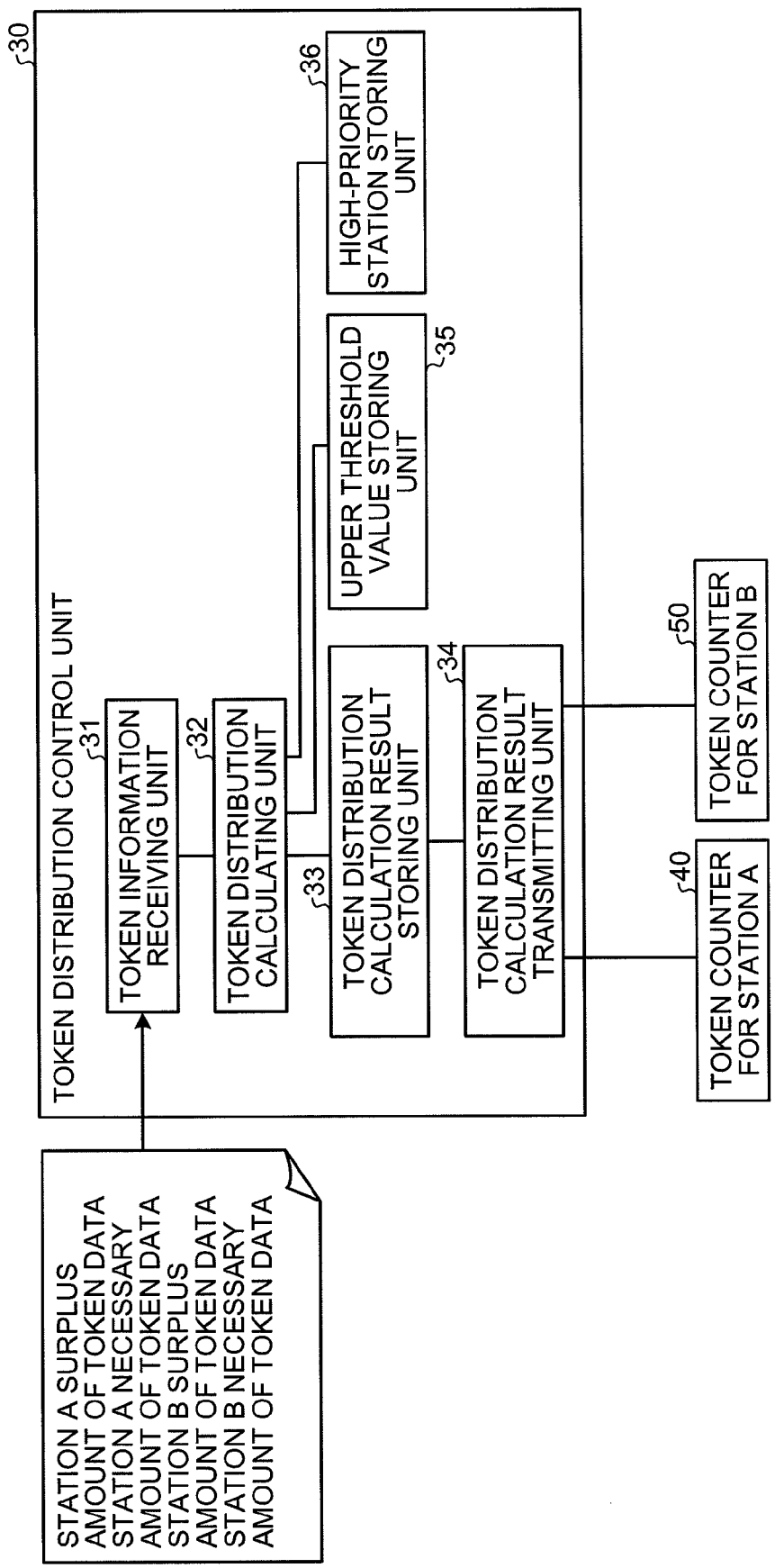
FIG. 23 is a block diagram showing a configuration of a bandwidth control system according to the third embodiment.

FIG. 23 is a block diagram showing a configuration of the bandwidth control system according to the third embodiment. FIGS. 24 and 25 are schematic diagrams for explaining a necessary token calculating unit according to the third embodiment. FIG. 26 is a schematic diagram for explaining a token distribution control unit according to the third embodiment.

As shown in FIG. 23, the bandwidth control system according to the third embodiment is fundamentally similar to but different from the bandwidth control system according to the second embodiment shown in FIG. 15 in that the token distribution control unit 30 is newly provided with a high-priority station storing unit 36. The high-priority station storing unit 36 corresponds to a "high-priority station storing unit" set forth in the claims.

The token information receiving unit 31 receives data that the station A transmitting unit 14 and the station B transmitting unit 24 transmit each time a predetermined time elapses. Concretely, it receives "station A surplus amount of token data" from the station A surplus amount of token transmitting unit 141, receives "station A necessary amount of token data" from the station A necessary amount of token transmitting unit 142, receives "station B surplus amount of token data" from the station B surplus amount of token transmitting unit 241, and receives "station B necessary amount of token data" from the station B necessary amount of token transmitting unit 242.

Specifically, in the case shown in FIG. 24, it receives data of calculating no "surplus amount of token" (or of setting "surplus amount of token" as "0") as "station A surplus amount of token data" from the station A surplus amount of token transmitting unit 141, and receives data consisting of the "maximum amount of token: 100", a "residual amount of token: 70", a "residual amount of output buffer: 75", and a "necessary amount of token: 5" as "station A necessary amount of token data" from the station A necessary amount of token transmitting unit 142. And in the case shown in FIG. 25, it receives data of calculating no "surplus amount of token" (or of setting "surplus amount of token" as "0") as "station B surplus amount of token data" from the station B surplus amount of token transmitting unit 241, and receives data consisting of the "maximum amount of token: 10", a "residual amount of token: 10", a "residual amount of output buffer: 15", and a "necessary amount of token: 5" as "station B necessary amount of token data" from the station B necessary amount of token transmitting unit 242.

The high-priority station storing unit 36 sets and stores a high-priority station indicating a station to be higher in priority among a plurality of stations each of which the same user has a bandwidth contract for, and the token distribution calculating unit 32 calculates an amount of token to be distributed to a token counter of a high-priority station from a residual amount of token in a low-priority station other than the high-priority station, when a necessary amount of token has been calculated in each of the stations each of which the same user has a bandwidth contract for. Concretely, as shown in FIG. 26, the token distribution calculating unit 32 performs a calculation to distribute a necessary amount of token "5" of the station A to the token counter for station A 40 of the station A stored as a high-priority station in the high-priority station storing unit 36 from the residual amount of token of the station B being a low-priority station. At this time, the token distribution calculating unit 32 also judges that the amount of token "75" after the amount of token "5" has been distributed to the token counter for station A 40 is equal to or smaller than the upper threshold value "100" of the station A stored in the upper threshold value storing unit 35. The upper threshold value "20" of the station B is not used in the calculation.

By transmitting data of the token distribution calculation result storing unit 33 storing the result of calculation of the token distribution calculating unit 32, the token distribution calculation result transmitting unit 34 increases the residual amount of token of the token counter for station A 40 by "5" to be "75", and decreases the residual amount of token of the token counter for station B by "5" to be "5".

Figure 27:
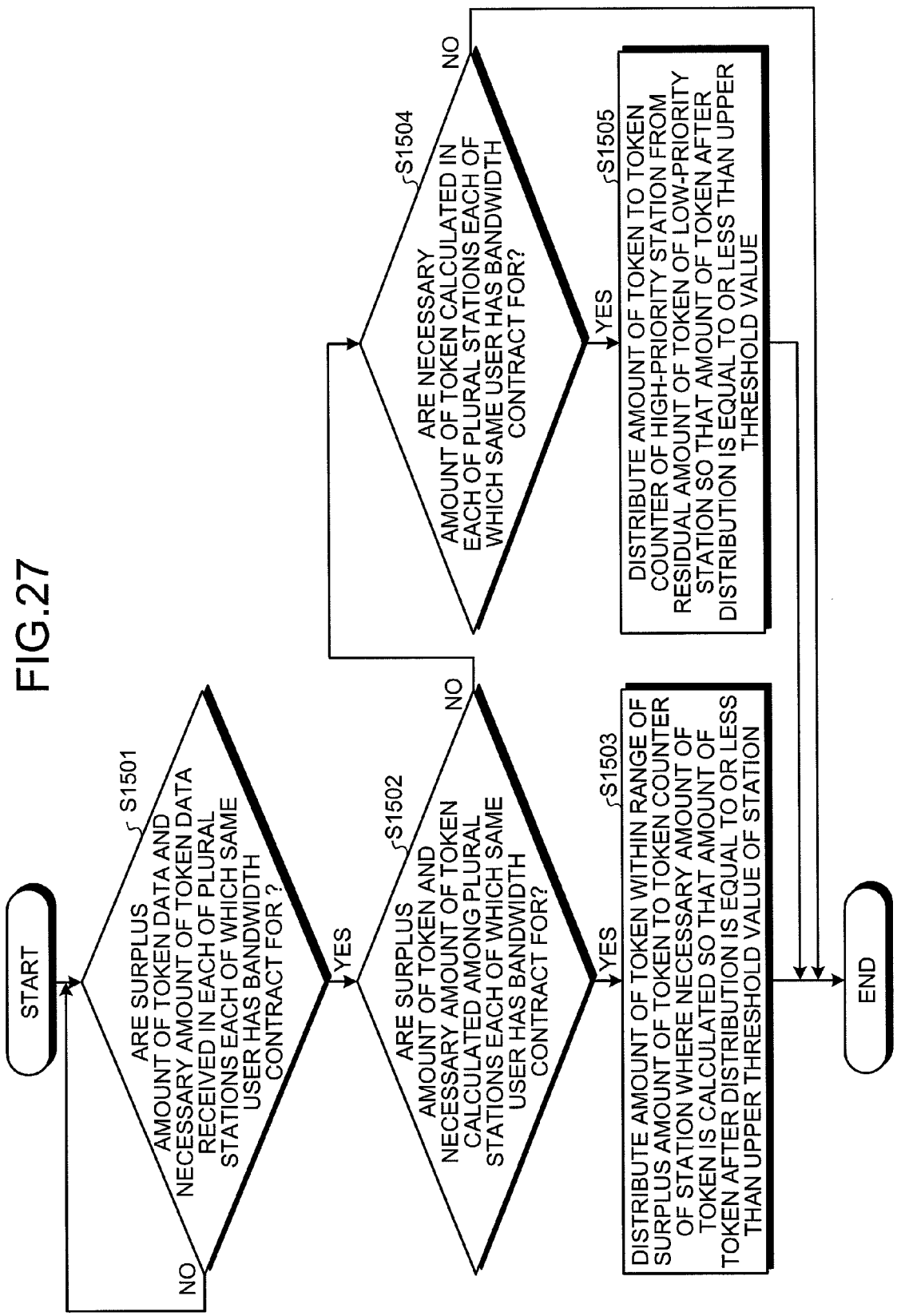
FIG. 27 is a flowchart of a token distribution control process according to the third embodiment.

FIG. 27 is a flowchart of a processing procedure performed by the token distribution control unit according to the third embodiment.

First, when the token distribution control unit 30 according to the third embodiment receives surplus amount of token data and necessary amount of token data in each of a plurality of stations each of which the same user has a bandwidth contract for (Yes at step S1501), it judges whether a surplus amount of token and a necessary amount of token have been calculated among the stations each of which the same user has a bandwidth contract for (step S1502).

When a surplus amount of token and a necessary amount of token have been calculated among the stations each of which the same user has a bandwidth contract for (Yes at step S1502), an amount of token within the range of surplus amount of token is distributed to a token counter of a station in which the necessary amount of token has been calculated so that the amount of token after distribution is equal to or smaller than the upper threshold value of the station (step S1503), and the processing is ended.

On the contrary, when a surplus amount of token and a necessary amount of token have not been calculated among a plurality of stations each of which the same user has a bandwidth contract for (No at step S1502), the token distribution control unit 30 judges whether a necessary amount of token has been calculated in each of the stations each of which the same user has a bandwidth contract for (step S1504) and, when a surplus amount of token has been calculated in each of the stations each of which the user has a bandwidth contract for (No at step S1504), ends the processing.

On the contrary, when the necessary amount of token has been calculated in each of a plurality of stations each of which the user has a bandwidth contract for (Yes at step S1504), an amount of token is distributed to a token counter of a high-priority station from a residual amount of token of a low-priority station so that the amount of token after distribution is equal to or smaller than the upper threshold value (step S1505), and the processing is ended.

As shown in FIG. 26, the system performs a calculation to distribute a necessary amount of token of the station A "5" to the token counter for station A 40 of the station A stored as a high-priority station in the high-priority station storing unit 36 from the residual amount of token of the station B being a low-priority station. By transmitting data of the token distribution calculation result storing unit 33 storing the result of calculation of the token distribution calculating unit 32, the token distribution calculation result transmitting unit 34 increases the residual amount of token of the token counter for station A 40 by "5" to be "75" and decreases the residual amount of token of the token counter for station B 50 by "5" to be "5".

As described above, according to the third embodiment, since the system sets and stores station A as a high-priority station out of the station A and station B each of which the same user has a bandwidth contract for and, when a necessary amount of token has been calculated in each of the station A and station B, distributes an amount of token to the token counter for station A 40 of the station A being a high-priority station from the residual amount of token in station B being a low-priority station, even when token demands compete with one another due to a fact that a necessary amount of token occurs in each of stations each of which the same user has a bandwidth contract for, it is possible to deliver an amount of token from a low-priority station to a high-priority station and to effectively utilize an amount of token according to the degree of importance among the stations each of which the same user has a bandwidth contract for.

While, in the third embodiment described above, the case of distributing an amount of token to a high-priority station from a residual amount of token of a low-priority station when a necessary amount of token has been calculated in each of a plurality of stations each of which the same user has a bandwidth contract for has been explained, in a fourth embodiment of the present invention, a case of distributing an amount of token to a high-priority station so that the amount of token after distribution of a low-priority station is equal to or larger than the lower threshold value is explained.

FIG. 16 is a schematic diagram for explaining an outline and features of the bandwidth control system according to the fourth embodiment.

In a similar manner to the bandwidth control system according to the first embodiment, the bandwidth control system according to the fourth embodiment first calculates a surplus amount of token for a station in which a residual amount of output buffer is smaller than a residual amount of token and calculates a necessary amount of token for a station in which a residual amount of output buffer is larger than a residual amount of token.

Figure 28:
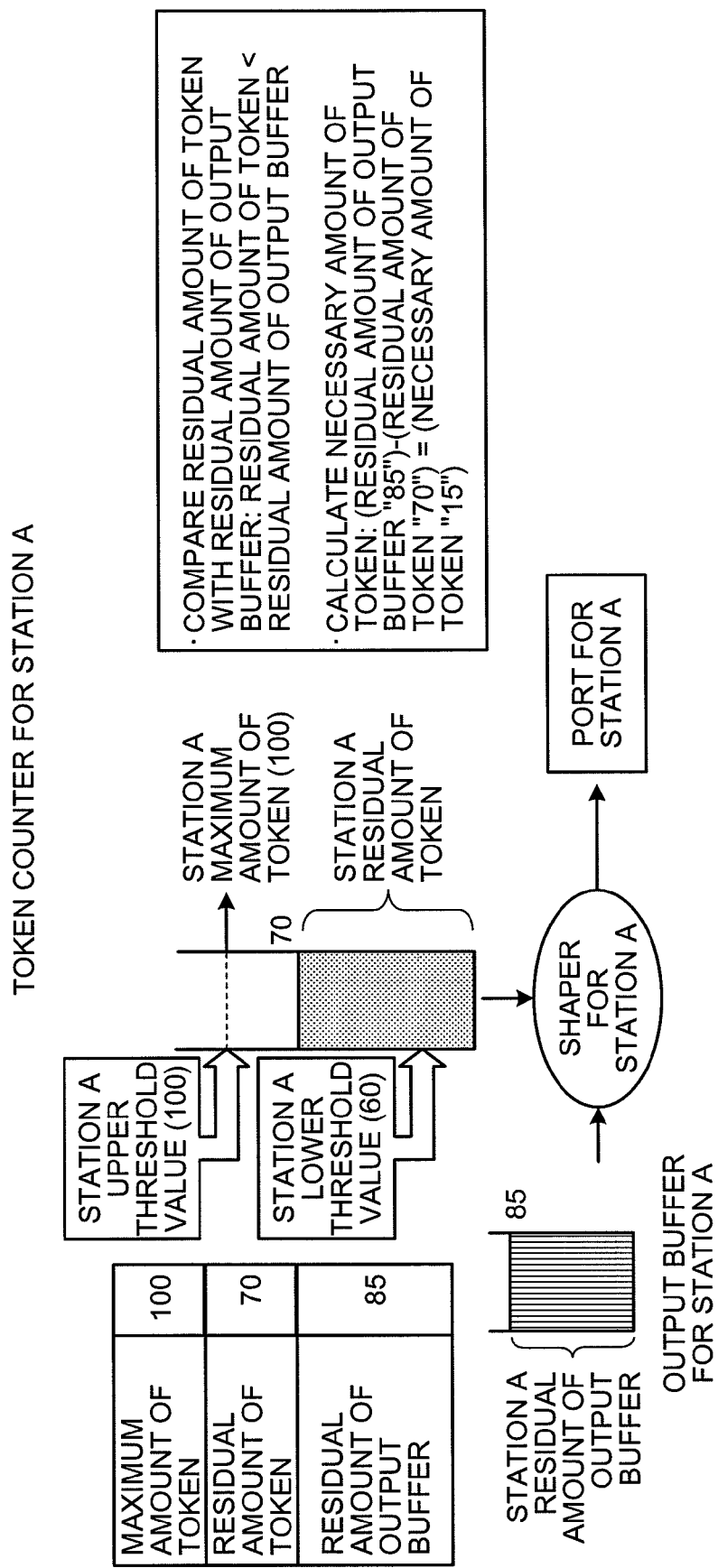

As shown in FIG. 28, when a "residual amount of token" at a point after a predetermined time has elapsed is "70" and a "residual amount of output buffer" is "85" at the same point in station A in which the "maximum amount of token" is "100", since the "residual amount of output buffer" is larger than the "residual amount of token", the system calculates the "necessary amount of token" to be "15" by subtracting "70" being the residual amount of token" from "85" being the "residual amount of output buffer". And as shown in FIG. 29, when a "residual amount of token" at a point after a predetermined time has elapsed (at the same time as the point shown in FIG. 28) is "20" and a "residual amount of output buffer" is "25" at the same point in station B in which the "maximum amount of token" is "30", since the "residual amount of output buffer" is larger than the "residual amount of token", the system calculates the "necessary amount of token" to be "5" by subtracting "20" being the "residual amount of token" from "25" being the "residual amount of output buffer".

Subsequently, the bandwidth control system according to the fourth embodiment stores a lower threshold value indicating the lower limit amount of token after distribution in each of a plurality of stations each of which the same user has a bandwidth contract for and, when a necessary amount of token has been calculated in each of the stations each of which the same user has a bandwidth contract for, distributes an amount of token to a token counter of a high-priority station from a residual amount of token in a low priority station so that the amount of token after distribution of the low-priority station is equal to or larger than the lower threshold value.

Figure 29:
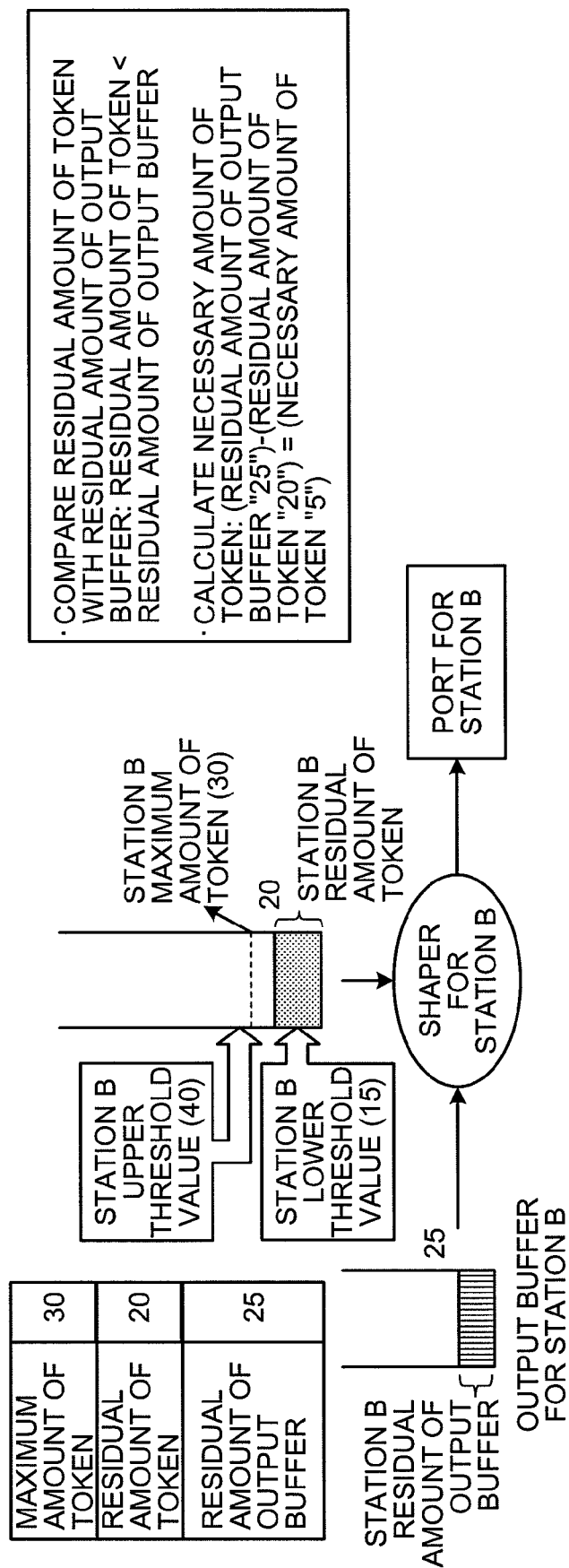

When a necessary amount of token has been calculated in each of the station A and station B as shown in FIG. 28 and FIG. 29, the system calculates and distributes an amount of token to be distributed to the token counter of the station A set as a high-priority station from the residual amount of token of the station B being a low-priority station, as shown in FIG. 30, based on the information that the upper threshold value of the station A is "100", the lower threshold value of the station A is "60", the upper threshold value of the station B is "40", and the lower threshold value of the station B is "15".

The system distributes an amount of token within the range of "15" being the necessary amount of token of the station A to the token counter of the station A set as a high-priority station from a residual amount of token of the station B. At this time, since the sum "30" of "15" being the "necessary amount of token" of the station A and the lower threshold value "15" of the station B is larger than "20" being the "residual amount of token" of the station B, the system distributes an amount of token "5" obtained by subtracting the lower threshold value "15" of the station B from "20" being the "residual amount of token" of the station B to the token counter of the station A. As a result, as shown in FIG. 30, the amount of token of the token counter for station A increases to "75" and the amount of token of the token counter for station B decreases to "15". That is, station B being a low-priority station does not deliver "15" being a necessary amount of token of the station A being a high-priority station from "20" being the "residual amount of token" to the token counter for station A but delivers only an amount of token "5" to guarantee the lower threshold value of the station B.

From the above aspect, even when deliver an amount of token from a low-priority station to a high-priority station when token demands compete with one another due to occurrence of a necessary amount of token in each of a plurality of stations each of which the same user has a bandwidth contract for, it is possible to secure a lower limit bandwidth in the low-priority station and to effectively utilize an amount of token while guaranteeing a contract with a user's station.

Figure 31:
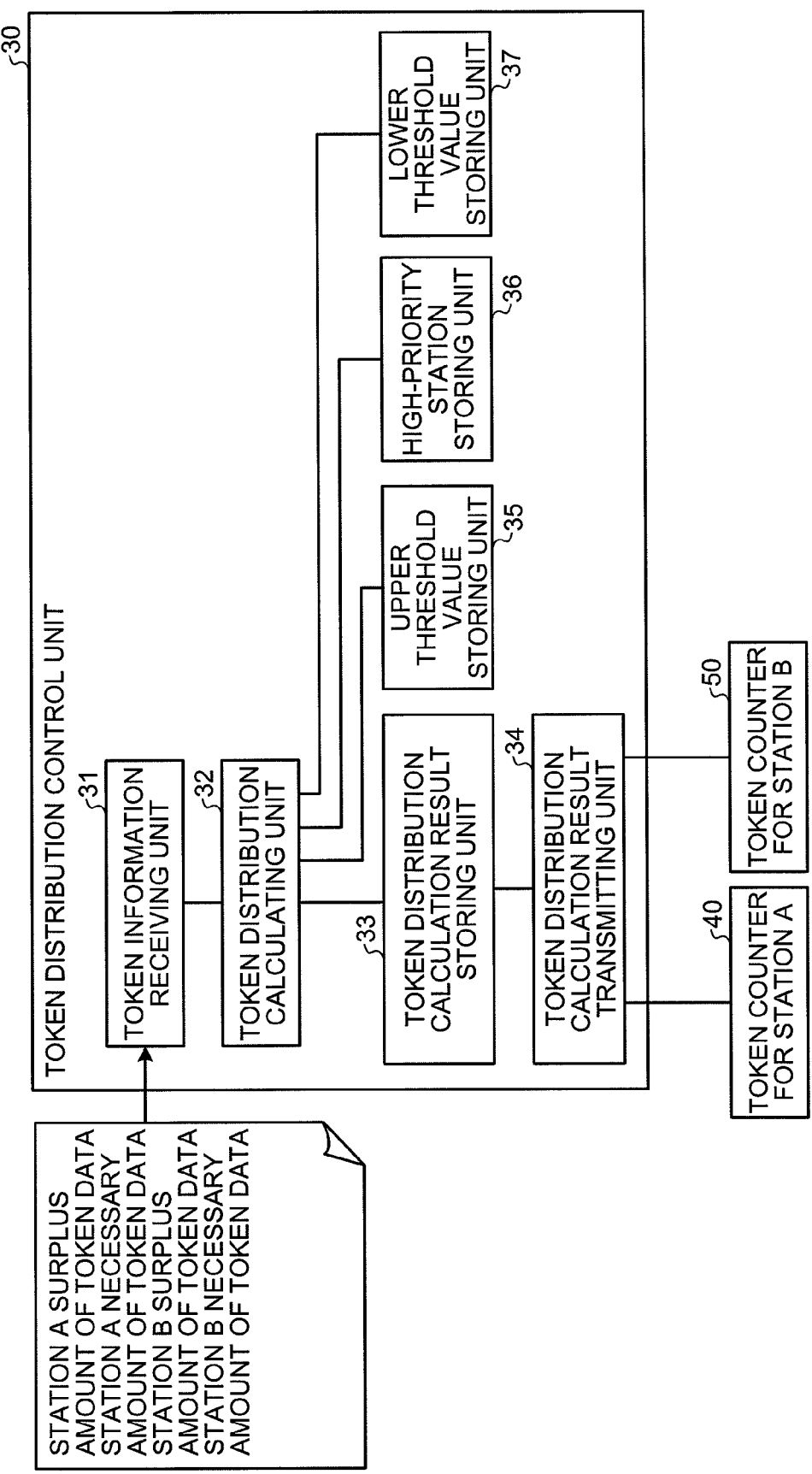
FIG. 31 is a block diagram showing a configuration of a bandwidth control system according to the fourth embodiment.

FIG. 31 is a block diagram showing a configuration of the bandwidth control system according to the fourth embodiment. FIGS. 32 and 33 are schematic diagrams for explaining a necessary token calculating unit according to the fourth embodiment. FIG. 34 is a schematic diagram for explaining a token distribution control unit according to the fourth embodiment.

As shown in FIG. 31, the bandwidth control system according to the fourth embodiment is fundamentally similar to but different from the bandwidth control system according to the third embodiment shown in FIG. 23 in that the token distribution control unit 30 is newly provided with a lower threshold value storing unit 37. Hereupon, the lower threshold value storing unit 37 corresponds to a "lower threshold value storing unit" according to the claims.

The token information receiving unit 31 receives data that the station A transmitting unit 14 and the station B transmitting unit 24 transmit each time a predetermined time elapses. Concretely, it receives "station A surplus amount of token data" from the station A surplus amount of token transmitting unit 141, receives "station A necessary amount of token data" from the station A necessary amount of token transmitting unit 142, receives "station B surplus amount of token data" from the station B surplus amount of token transmitting unit 241, and receives "station B necessary amount of token data" from the station B necessary amount of token transmitting unit 242.

Specifically, in the case shown in FIG. 32, the token information receiving unit 31 receives data of calculating no "surplus amount of token" (or of setting "surplus amount of token" as "0") as "station A surplus amount of token data" from the station A surplus amount of token transmitting unit 141, and receives data consisting of the "maximum amount of token: 100", a "residual amount of token: 70", a "residual amount of output buffer: 85", and a "necessary amount of token: 15" as "station A necessary amount of token data" from the station A necessary amount of token transmitting unit 142. And in the case shown in FIG. 33, it receives data of calculating no "surplus amount of token" (or of setting "surplus amount of token" as "0") as "station B necessary amount of token data" from the station B surplus amount of token transmitting unit 241, and receives data consisting of the "maximum amount of token: 30", a "residual amount of token: 20", a "residual amount of output buffer: 25", and a "necessary amount of token: 5" as "station B necessary amount of token data" from the station B necessary amount of token transmitting unit 242.

The high-priority station storing unit 36 sets and stores a high-priority station indicating a station to be higher in priority among a plurality of stations each of which the same user has a bandwidth contract for, the lower threshold value storing unit 37 stores a lower threshold value indicating the lower limit amount of token after distribution in each of the stations each of which the same user has a bandwidth contract for, and the token distribution calculating unit 32 calculates an amount of token to be distributed to a token counter of a high-priority station from a residual amount of token in a low-priority station so that the amount of token after distribution of the low-priority station is equal to or larger than the lower threshold value.

Since the necessary amount of token has been calculated in each of the station A and the station B as shown in FIGS. 32 and 33, the system calculates an amount of token to be distributed to the token counter of the station A set as a high-priority station from the residual amount of token of the station B being a low-priority station based on the information that the upper threshold value "100" of the station A is "100", the lower threshold value of the station A is "60", the upper threshold value of the station B is "40", and the lower threshold value of the station B is "15".

Concretely, an amount of token is distributed within the range of "15" being the necessary amount of token of the station A to the token counter of the station A set as a high-priority station from the residual amount of token of the station B. At this time, since the sum "30" of "15" being the "necessary amount of token" of the station A and the lower threshold value "15" of the station B is larger than "20" being the "residual amount of token" of the station B, the system avoids distributing an amount of token "15" being the necessary amount of token of the station A and calculates an amount of token "5" obtained by subtracting the lower threshold value "15" of the station B from "20" being the "residual amount of token" of the station B as the amount of token to be distributed to the token counter of the station A. At this time the token distribution calculating unit 32 judges also that the amount of token "75" after the amount of token "5" has been distributed to the token counter for station A 40 is equal to or smaller than the upper threshold value "100" of the station A stored in the upper threshold value storing unit 35.

By transmitting data of the token distribution calculation result storing unit 33 storing the result of calculation of the token distribution calculating unit 32, the token distribution calculation result transmitting unit 34 increases the residual amount of token of the token counter for station A 40 by "5" to be "75", and decreases the residual amount of token of the token counter for station B 50 by "5" to be "15" (see FIG. 34).

Figure 35:
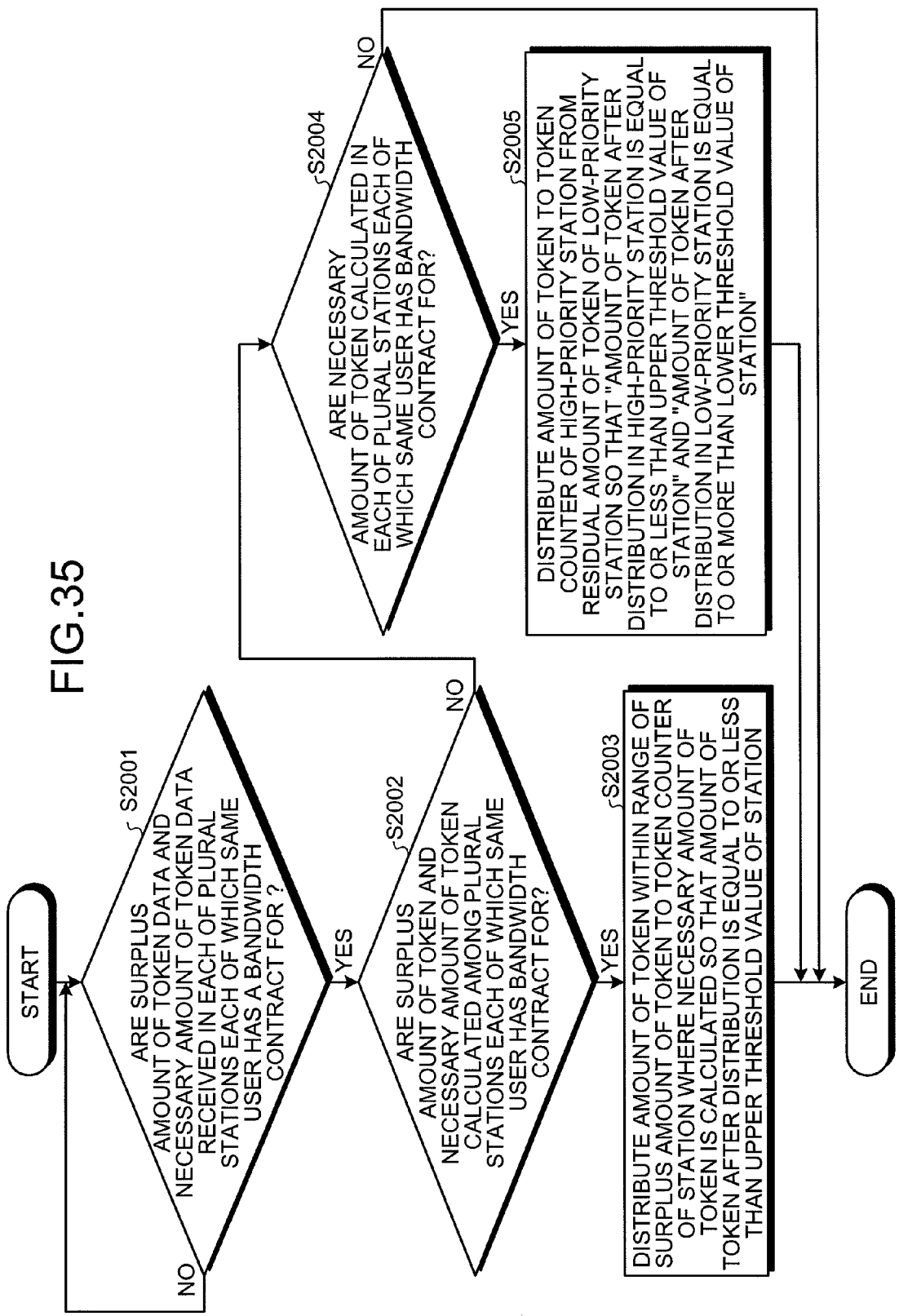
FIG. 35 is a flowchart of a token distribution control process according to the fourth embodiment.

FIG. 35 is a flowchart of a processing procedure performed by the token distribution control unit according to the fourth embodiment.

First, when the token distribution control unit 30 according to the fourth embodiment receives surplus amount of token data and necessary amount of token data in each of a plurality of stations each of which the same user has a bandwidth contract for (Yes at step S2001), it judges whether a surplus amount of token and a necessary amount of token have been calculated among the stations each of which the same user has a bandwidth contract for (step S2002).

When a surplus amount of token and a necessary amount of token have been calculated among the stations each of which the same user has a bandwidth contract for (Yes at step S2002), an amount of token within the range of surplus amount of token is distributed to a token counter of a station in which the necessary amount of token has been calculated so that the amount of token after distribution is equal to or smaller than the upper threshold value of the station (step S2003), and the processing is ended.

On the contrary, when a surplus amount of token and a necessary amount of token have not been calculated among a plurality of stations each of which the same user has a bandwidth contract for (No at step S2002), the system judges whether a necessary amount of token has been calculated in each of the stations each of which the same user has a bandwidth contract for (step S2004) and, when a surplus amount of token has been calculated in each of the stations each of which the user has a bandwidth contract for (No at step S2004), ends the processing.

On the contrary, when a necessary amount of token has been calculated in each of a plurality of stations each of which the user has a bandwidth contract for (Yes at step S2004), an amount of token is distributed to a token counter of a high-priority station from a residual amount of token of a low-priority station so that "the amount of token after distribution in the high-priority station is equal to or smaller than the upper threshold value of the station" and "the amount of token after distribution in the low-priority station is equal to or larger than the lower threshold value of the low-priority station" (step S2005), and the processing is ended.

As shown in FIG. 34, the system performs a calculation to distribute an amount of token "5" to the token counter for station A 40 of the station A stored as a high-priority station in the high-priority station storing unit 36 from the residual amount of token of the station B with reference to the lower threshold value "15" of the low-priority station B stored in the lower threshold value storing unit 37. By transmitting data of the token distribution calculation result storing unit 33 storing the result of calculation of the token distribution calculating unit 32, the token distribution calculation result transmitting unit 34 increases the residual amount of token of the token counter for station A 40 by "5" to be "75" and decreases the residual amount of token of the token counter for station B 50 by "5" to be "15".

As described above, according to the fourth embodiment, since the system stores a lower threshold value indicating the lower limit amount of token after distribution in each of the station A and station B each of which the same user has a bandwidth contract for and, when a necessary amount of token has been calculated in each of the station A and station B, distributes an amount of token to the token counter for station A 40 of the station A being a high-priority station from the residual amount of token in station B being a low-priority station so that the amount of token after distribution of the station B is equal to or larger than the lower threshold value of the station B, even when delivering an amount of token from station B to station A when token demands compete with one another due to a fact that a necessary amount of token occurs in each of the station A and station B, it is possible to secure a lower limit bandwidth in station B being a low-priority station and to effectively utilize an amount of token while guaranteeing a contract with a user's station.

Although the first to the fourth embodiments have been described up to now, the present invention can be implemented in various embodiments in addition to the embodiments. As a bandwidth control system according to a fifth embodiment of the present invention, various embodiments are divided into three categories and explained as follows.

Although the case of calculating an amount of token to be distributed using an upper threshold value set for each station even under the condition that a necessary amount of token has been calculated in each of a plurality of stations each of which the same user has a bandwidth contract for have been explained in the third and fourth embodiments, the present invention is not limited to this but may calculate an amount of token to be distributed using an upper threshold value set for each station only under the condition that a surplus amount of token and a necessary amount of token have been calculated among a plurality of stations each of which the same user has a bandwidth contract for.

Although the case of installing the upper threshold value storing unit 35 in the token distribution control unit 30 has been explained in the second to fourth embodiments, the present invention is not limited to this but may make the station A token monitor control unit 10 and the station B token monitor control unit 20 store their respective upper threshold values and may calculate such a necessary amount of token that the amount of token after distribution is equal to or smaller than each of the upper threshold values.

All or a part of the processes that have been explained as automatically performed processes out of the processes explained in the above-mentioned embodiments may be manually performed. For example, calculation of a surplus amount of token and calculation of a necessary amount of token may be received from operation of a keyboard or a touch panel by a user.

Each component of each apparatus illustrated is functionally conceptual and does not necessarily need to be physically composed as illustrated. That is, concrete embodiments of distribution or integration of the respective processing units and storing units (for example, the units of FIG. 6) are not limited to the illustrations but may be composed by physically distributing or integrating all or part of them in arbitrary units according to various conditions of load or use, for example, by integrating the token distribution calculation result storing unit 33 and the token distribution calculation result transmitting unit 34 with each other. Further, all or part of processing functions performed by the respective apparatuses may be implemented by a program analyzed and executed by a CPU or the CPU, or may be implemented as hardware by wired logic.

Figure 36:
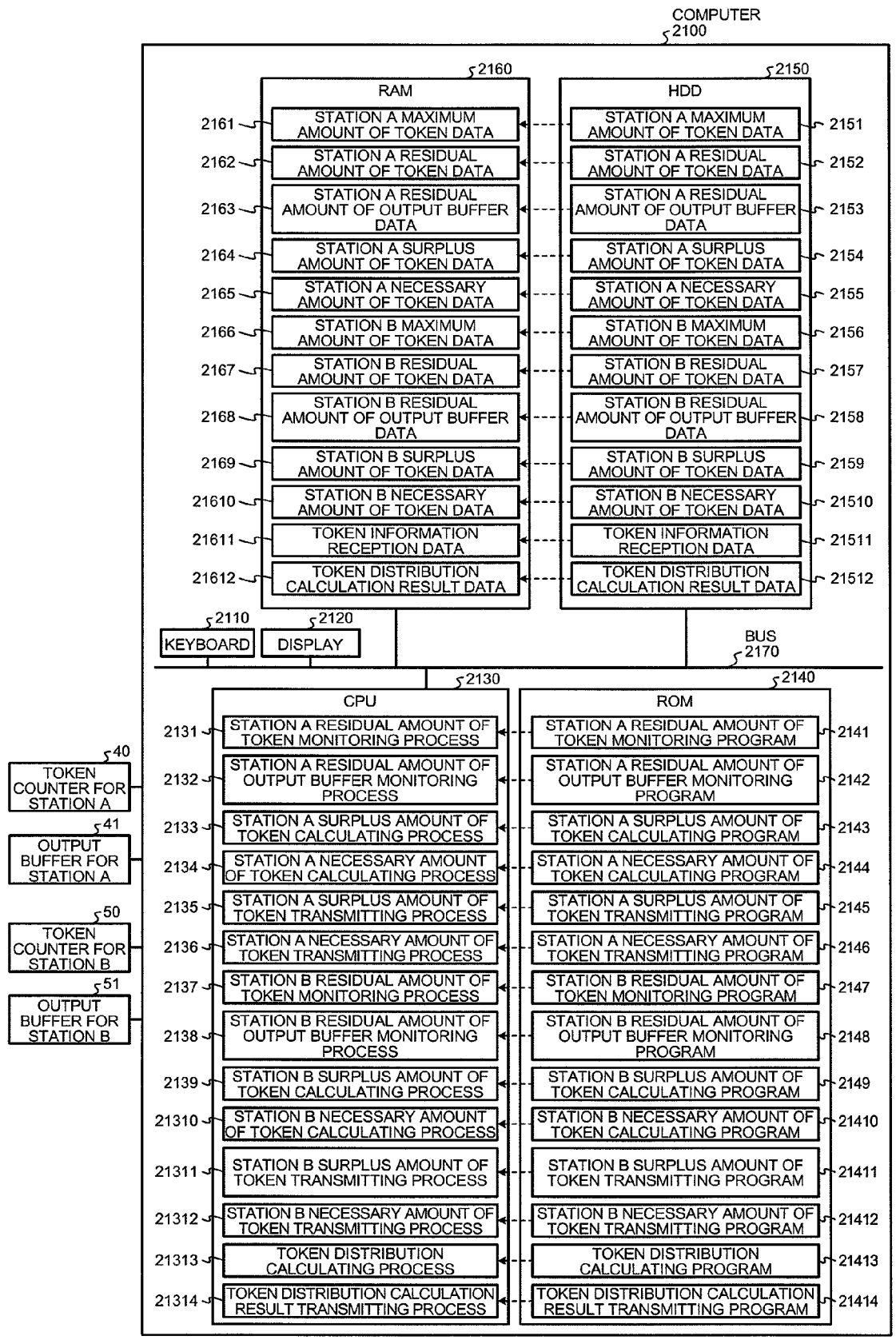
FIG. 36 is a block diagram of a computer executing a bandwidth control program according to the present invention.

Although the case of implementing various processes by means of hardware logic has been explained in the first to fourth embodiments, the present invention is not limited to this but may execute a program prepared in advance by means of a computer. An example of a computer executing a bandwidth control program having a similar function to the bandwidth control system shown in the first embodiment is explained using FIG. 36 in the following. FIG. 36 is a diagram showing a computer executing a bandwidth control program according to the first embodiment.

As shown in FIG. 36, a computer 2100 as an information processing apparatus is composed of a keyboard 2110, a display 2120, a CPU 2130, a ROM 2140, an HDD 2150 and a RAM 2160 connected with one another by a bus 2170 or the like and further is connected to the token counter for station A 40, the output buffer for station A 41, the token counter for station B 50, and the output buffer for station B 51.

A bandwidth control program exhibiting a similar function to the bandwidth control system shown in the first embodiment, namely, a station A residual amount of token monitoring program 2141, a station A residual amount of output buffer monitoring program 2142, a station A surplus amount of token calculating program 2143, a station A necessary amount of token calculating program 2144, a station A surplus amount of token transmitting program 2145, a station A necessary amount of token transmitting program 2146, a station B residual amount of token monitoring program 2147, a station B residual amount of output buffer monitoring program 2148, a station B surplus amount of token calculating program 2149, a station B necessary amount of token calculating program 21410, a station B surplus amount of token transmitting program 21411, a station B necessary amount of token transmitting program 21412, a token distribution calculating program 21413, and a token distribution calculation result transmitting program 21414 are stored in the ROM 2140 in advance as shown in FIG. 36. The programs 2141 to 21414 may be properly integrated or distributed in a similar manner to the respective components of the bandwidth control system shown in FIG. 6.

Due to a fact that the CPU 2130 reads and executes these programs 2141 to 21414 from the ROM 2140, as shown in FIG. 36, the programs 2141 to 21414 function as a station A residual amount of token monitoring process 2131, a station A residual amount of output buffer monitoring process 2132, a station A surplus amount of token calculating process 2133, a station A necessary amount of token calculating process 2134, a station A surplus amount of token transmitting process 2135, a station A necessary amount of token transmitting process 2136, a station B residual amount of token monitoring process 2137, a station B residual amount of output buffer monitoring process 2138, a station B surplus amount of token calculating process 2139, a station B necessary amount of token calculating process 21310, a station B surplus amount of token transmitting process 21311, a station B necessary amount of token transmitting process 21312, a token distribution calculating process 21313, and a token distribution calculation result transmitting process 21314. The processes 2131 to 21314 respectively correspond to the station A residual amount of token monitoring unit 111, the station A residual amount of output buffer monitoring unit 112, the station A surplus amount of token calculating unit 131, the station A necessary amount of token calculating unit 132, the station A surplus amount of token transmitting unit 141, the station A necessary amount of token transmitting unit 142, the station B residual amount of token monitoring unit 211, the station B residual amount of output buffer monitoring unit 212, the station B surplus amount of token calculating unit 231, the station B necessary amount of token calculating unit 232, the station B surplus amount of token transmitting unit 241, the station B necessary amount of token transmitting unit 242, the token distribution calculating unit 32, and the token distribution calculation result transmitting unit 34 as shown in FIG. 6.

As shown in FIG. 36, the HDD 2150 is provided with station A maximum amount of token data 2151, station A residual amount of token data 2152, station A residual amount of output buffer data 2153, station A surplus amount of token data 2154, station A necessary amount of token data 2155, station B maximum amount of token data 2156, station B residual amount of token data 2157, station B residual amount of output buffer data 2158, station B surplus amount of token data 2159, station B necessary amount of token data 21510, token information reception data 21511, and token distribution calculation result data 21512. The data 2151 to 21512 respectively correspond to the station A maximum amount of token storing unit 121, the station A residual amount of token storing unit 122, the station A residual amount of output buffer storing unit 123, the station A surplus amount of token storing unit 124, the station A necessary amount of token storing unit 125, the station B maximum amount of token storing unit 221, the station B residual amount of token storing unit 222, the station B residual amount of output buffer storing unit 223, the station B surplus amount of token storing unit 224, the station B necessary amount of token storing unit 225, the token information receiving unit 31, and the token distribution calculation result storing unit 33 shown in FIG. 6.

The CPU 2130 registers station A maximum amount of token data 2161 for station A maximum amount of token data 2151, registers station A residual amount of token data 2162 for station A residual amount of token data 2152, registers station A residual amount of output buffer data 2163 for station A residual amount of output buffer data 2153, registers station A surplus amount of token data 2164 for station A surplus amount of token data 2154, registers station A necessary amount of token data 2165 for station A necessary amount of token data 2155, registers station B maximum amount of token data 2166 for station B maximum amount of token data 2156, registers station B residual amount of token data 2167 for station B residual amount of token data 2157, registers station B residual amount of output buffer data 2168 for station B residual amount of output buffer data 2158, registers station B surplus amount of token data 2169 for station B surplus amount of token data 2159, registers station B necessary amount of token data 21610 for station B necessary amount of token data 21510, registers token information reception data 21611 for token information reception data 21511, and registers token distribution calculation result data 21612 for token distribution calculation result data 21512, and performs a bandwidth control process based on the data 2161 to 21612.

The programs 2141 to 21414 do not necessarily need to be stored in the ROM 2140 from the beginning but may be stored, for example, in a "portable physical medium" such as a flexible disk (FD), a CD-ROM, an MO disk, a DVD disk, a magneto-optical disk or an IC card to be inserted into the computer 2100, or a "fixed physical medium" such as an HDD provided inside or outside the computer 2100, or further in "another computer (or server)" to be connected to the computer 2100 through a public network, the Internet, a LAN, a WAN or the like, and may be read from these media and executed by the computer 2100. Hence, the aforementioned portable physical medium or fixed physical medium is a recording medium that is computer readable ("computer-readable recording medium").

As described above, according to one aspect of the present invention, it is possible to improve the state of packet transmission through distributing a surplus amount of token of a station to a token counter of another station being not good in the state of packet transmission due to being insufficient in residual amount of token, the stations having the same user, and to effectively utilize a token assigned to each of a plurality of stations each of which the same user has a bandwidth contract.

Furthermore, according to another aspect of the present invention, it is possible for a user to set priorities based on an upper threshold value among a plurality of stations each of which the same user has a bandwidth contract for and to effectively utilize a token according to the degree of importance among the stations each of which the same user has bandwidth contract for.

Moreover, according to still another aspect of the present invention, even when all the stations each of which the same user has a bandwidth contract for are competitive with one another for necessary amount of token, it is possible to deliver a token from a low-priority station to a high-priority station and to effectively utilize a token according to the degree of importance among the stations each of which the same user has a bandwidth contract for.

Furthermore, according to still another aspect of the present invention, even when delivering a token from a low-priority station to a high-priority station when all the stations each of which the same user has a bandwidth contract for are competitive with one another for necessary amount of token, it is possible to secure a lower-limit bandwidth for the low-priority station and to effectively utilize a token while guaranteeing a contract with the user's station.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system for distributing a token corresponding to a contraction bandwidth to a token counter of each of a plurality of stations and controlling a bandwidth according to a residual amount of token in the token counter by subtracting an amount of token corresponding to a packet from the token counter of a station each time the packet is read and relayed to each of the stations, the system comprising:
    a surplus amount of token calculating unit that calculates, for a station in which a residual amount of output buffer indicating a necessary amount of token for transmitting an untransmitted packet stored in the output buffer is smaller than the residual amount of token, a surplus amount of token by subtracting the residual amount of output buffer from the residual amount of token;
    a necessary amount of token calculating unit that calculates, for a station in which the residual amount of output buffer is larger than the residual amount of token, a necessary amount of token by subtracting the residual amount of token from the residual amount of output buffer;
    an upper threshold value storing unit that stores therein an upper threshold value indicating an upper-limit amount of token after distributing the token for each of the stations for which the same user has the bandwidth contract;
    a high-priority station storing unit that stores therein a high-priority station from among the stations for which the same user has the bandwidth contract;
    a lower threshold value storing unit that stores therein a lower threshold value indicating a lower-limit amount of token after distributing the token for each of the stations for which the same user has the bandwidth contract; and
    a token distributing unit that receives both the surplus amount of token and the necessary amount of token from a plurality of stations in which the surplus amount of token and the necessary amount of token have been calculated, and distributes, upon calculating the surplus amount of token and the necessary amount of token between a plurality of stations for which a same user has a bandwidth contract, a token within a range of the surplus amount of token to a token counter of a station in which the necessary amount of token has been calculated in such a manner that the amount of token after distributing the token is equal to or smaller than the upper threshold value of the station, from a station in which the surplus amount of token has been calculated, by transmitting information on an amount of the token to be distributed to a station in which the necessary amount of token has been calculated, wherein
    when the necessary amount of token has been calculated in a plurality of stations for which the same user has the bandwidth contract, the token distributing unit distributing the token to a token counter of the high-priority station from a residual amount of token of a low-priority station and distributing the token to the token counter of the high-priority station from the residual amount of token of the low-priority station in such a manner that the amount of token after distributing the token is equal to or larger than the lower threshold value.

2. A method of distributing a token corresponding to a contraction bandwidth to a token counter of each of a plurality of stations and controlling a bandwidth according to a residual amount of token in the token counter by subtracting an amount of token corresponding to a packet from the token counter of a station each time the packet is read and relayed to each of the stations, the method comprising:
    calculating, for a station in which a residual amount of output buffer indicating a necessary amount of token for transmitting an untransmitted packet stored in the output buffer is smaller than the residual amount of token, a surplus amount of token by subtracting the residual amount of output buffer from the residual amount of token;
    calculating, for a station in which the residual amount of output buffer is larger than the residual amount of token, a necessary amount of token by subtracting the residual amount of token from the residual amount of output buffer;
    receiving both the surplus amount of token and the necessary amount of token from a plurality of stations in which the surplus amount of token and the necessary amount of token have been calculated;
    storing an upper threshold value indicating an upper-limit amount of token after distributing the token for each of the stations for which the same user has the bandwidth contract;
    storing a high-priority station from among the stations for which the same user has the bandwidth contract;
    storing a lower threshold value indicating a lower-limit amount of token after distributing the token for each of the stations for which the same user has the bandwidth contract; and
    distributing, upon calculating the surplus amount of token and the necessary amount of token between a plurality of stations for which a same user has a bandwidth contract, a token within a range of the surplus amount of token to a token counter of a station in which the necessary amount of token has been calculated in such a manner that the amount of token after distributing the token is equal to or smaller than the upper threshold value of the station, from a station in which the surplus amount of token has been calculated, by transmitting information on an amount of the token to be distributed to a station in which the necessary amount of token has been calculated, wherein
    when the necessary amount of token has been calculated in a plurality of stations for which the same user has the bandwidth contract, the distributing distributes the token to a token counter of the high-priority station from a residual amount of token of a low-priority station and distributes the token to the token counter of the high-priority station from the residual amount of token of the low-priority station in such a manner that the amount of token after distributing the token is equal to or larger than the lower threshold value.

3. A computer-readable non-transitory recording medium that stores therein a computer program for distributing a token corresponding to a contraction bandwidth to a token counter of each of a plurality of stations and controlling a bandwidth according to a residual amount of token in the token counter by subtracting an amount of token corresponding to a packet from the token counter of a station each time the packet is read and relayed to each of the stations, the computer program causing a computer to execute:

calculating, for a station in which a residual amount of output buffer indicating a necessary amount of token for transmitting an untransmitted packet stored in the output buffer is smaller than the residual amount of token, a surplus amount of token by subtracting the residual amount of output buffer from the residual amount of token;

calculating, for a station in which the residual amount of output buffer is larger than the residual amount of token, a necessary amount of token by subtracting the residual amount of token from the residual amount of output buffer;

receiving both the surplus amount of token and the necessary amount of token from a plurality of stations in which the surplus amount of token and the necessary amount of token have been calculated;

storing an upper threshold value indicating an upper-limit amount of token after distributing the token for each of the stations for which the same user has the bandwidth contract;

storing a high-priority station from among the stations for which the same user has the bandwidth contract;

storing a lower threshold value indicating a lower-limit amount of token after distributing the token for each of the stations for which the same user has the bandwidth contract; and distributing, upon calculating the surplus amount of token and the necessary amount of token between a plurality of stations for which a same user has a bandwidth contract, a token within a range of the surplus amount of token to a token counter of a station in which the necessary amount of token has been calculated in such a manner that the amount of token after distributing the token is equal to or smaller than the upper threshold value of the station, from a station in which the surplus amount of token has been calculated, by transmitting information on an amount of the token to be distributed to a station in which the necessary amount of token has been calculated, wherein when the necessary amount of token has been calculated in a plurality of stations for which the same user has the bandwidth contract, the distributing distributes the token to a token counter of the high-priority station from a residual amount of token of a low-priority station and distributes the token to the token counter of the high-priority station from the residual amount of token of the low-priority station in such a manner that the amount of token after distributing the token is equal to or larger than the lower threshold value.

* * * * *